May 24, 1966  W. W. COLLINS ETAL  3,252,595
ARTICLE SORTING SYSTEM
Filed April 30, 1962  19 Sheets-Sheet 2
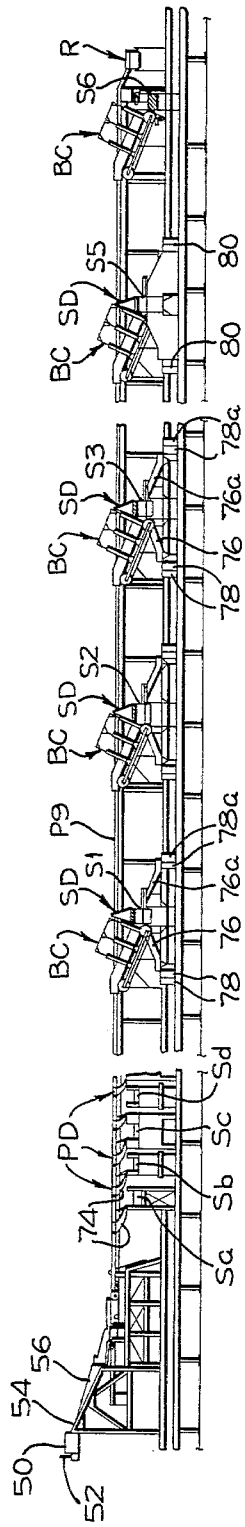
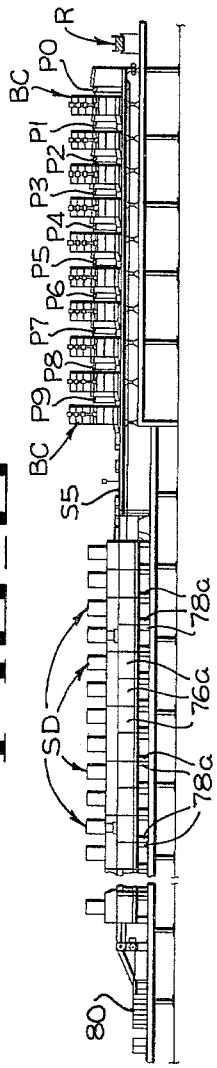
INVENTORS
WILLIAM W. COLLINS
PAUL A. GRANT
BY Hans G. Hoffmeister
ATTORNEY

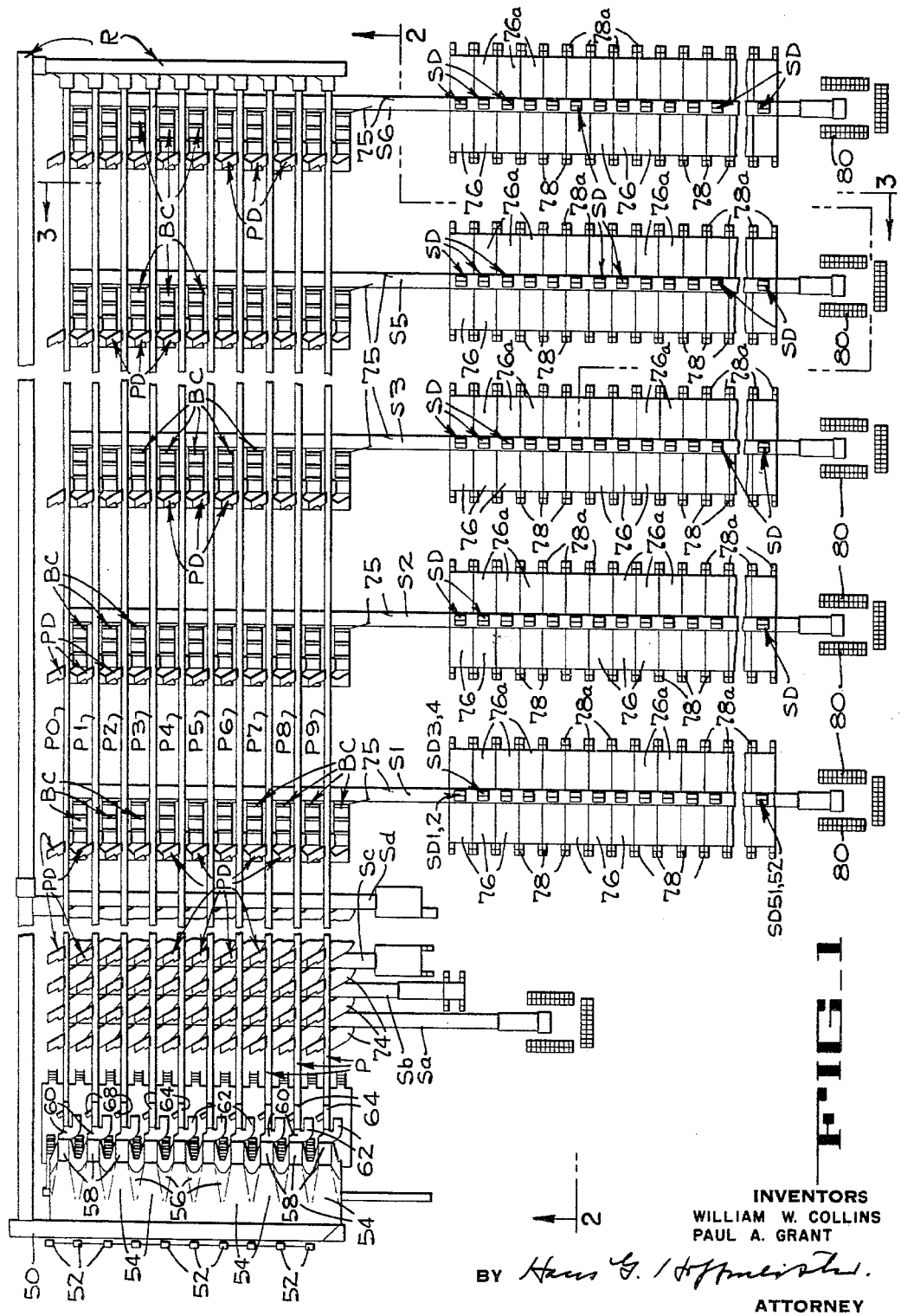

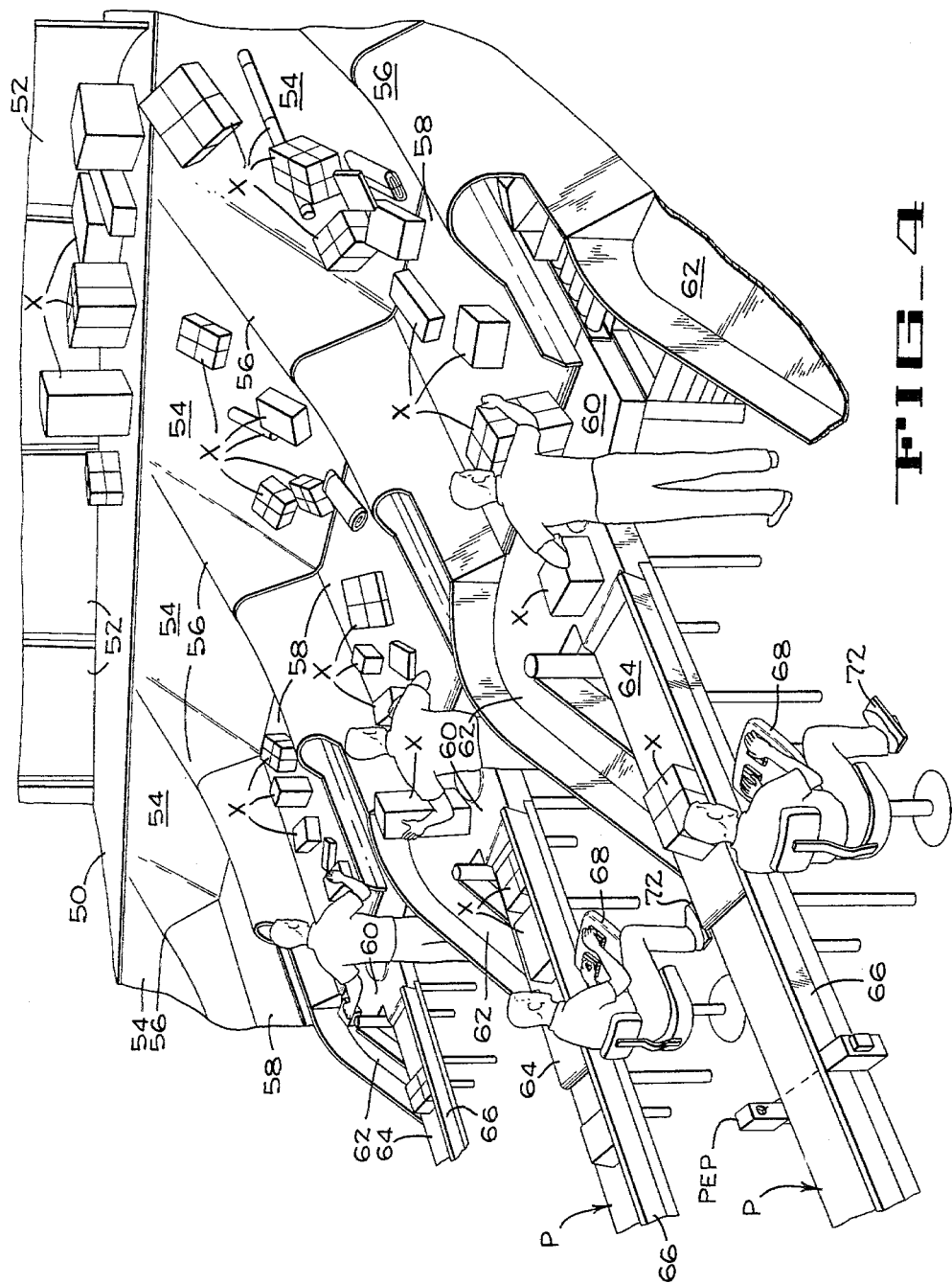

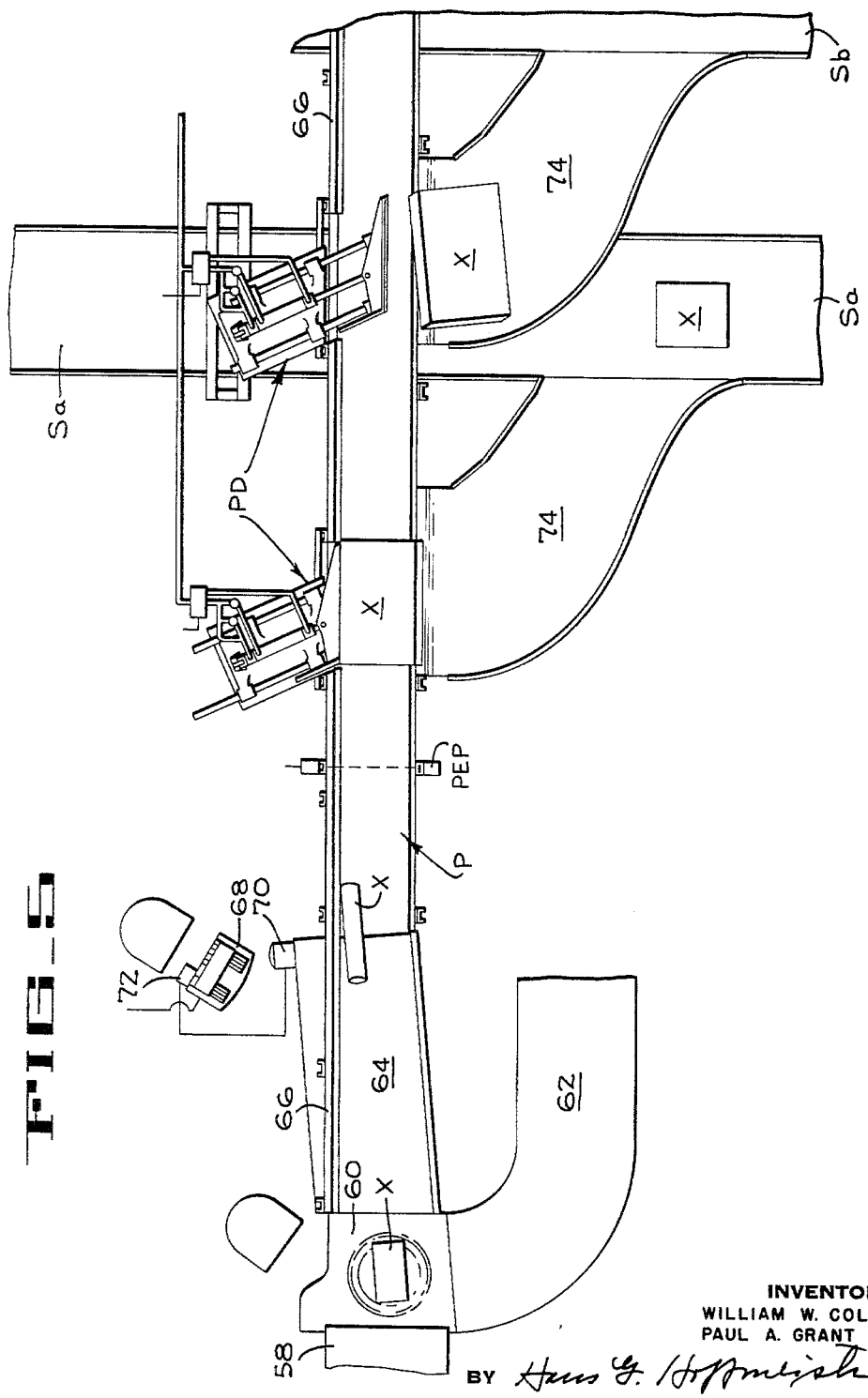

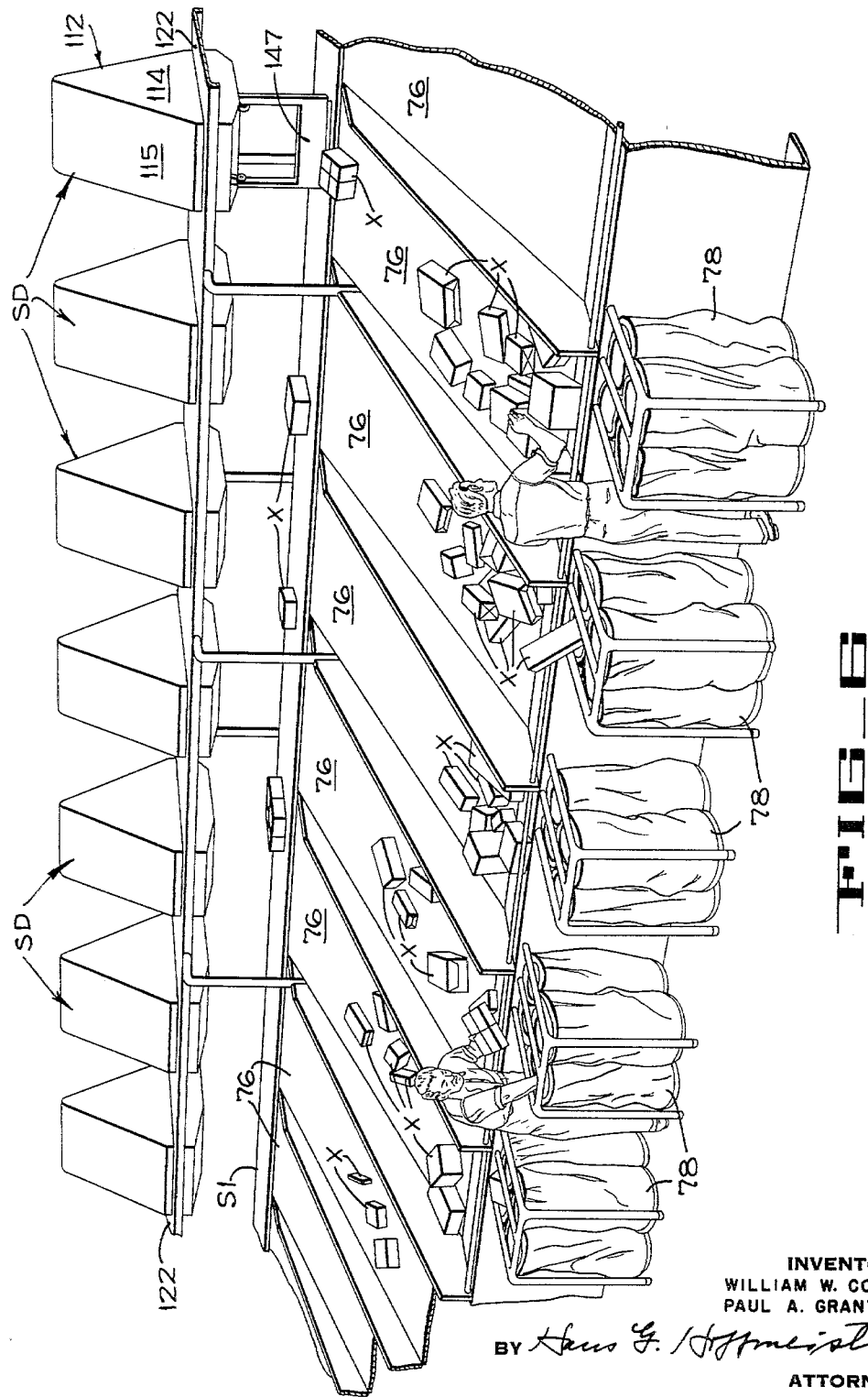

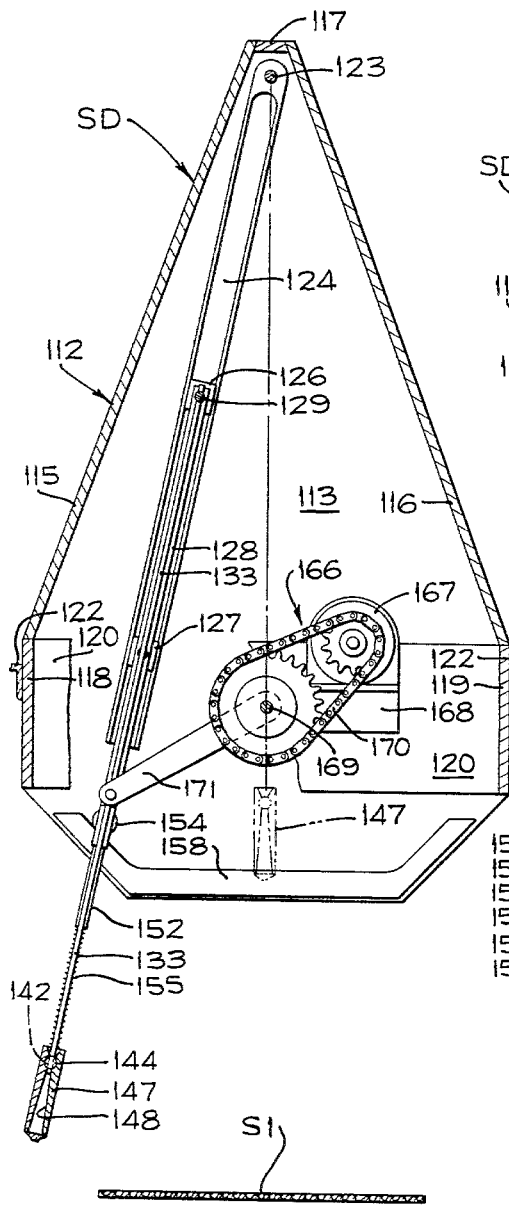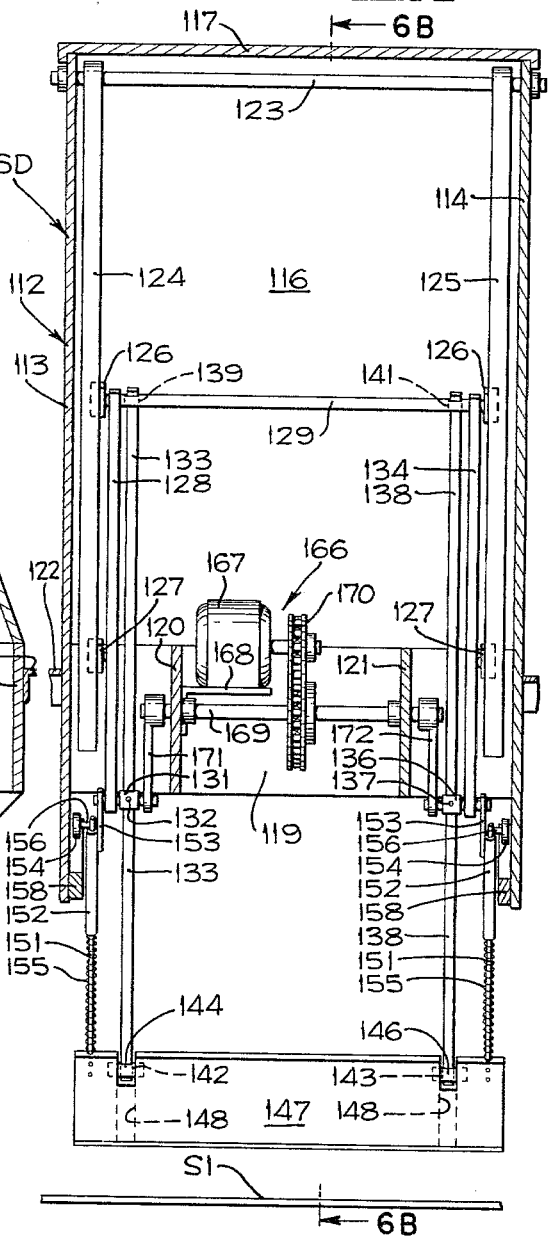

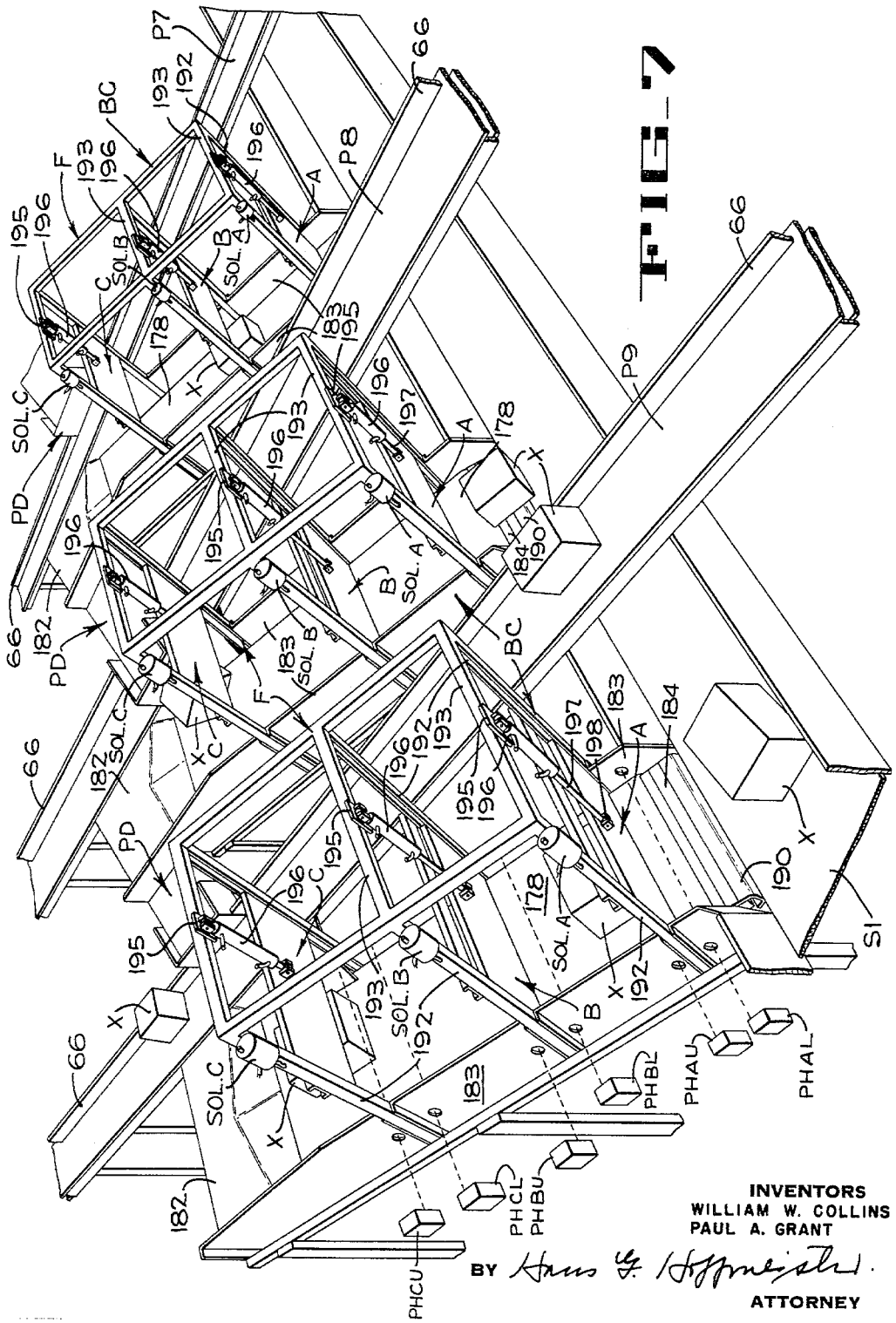

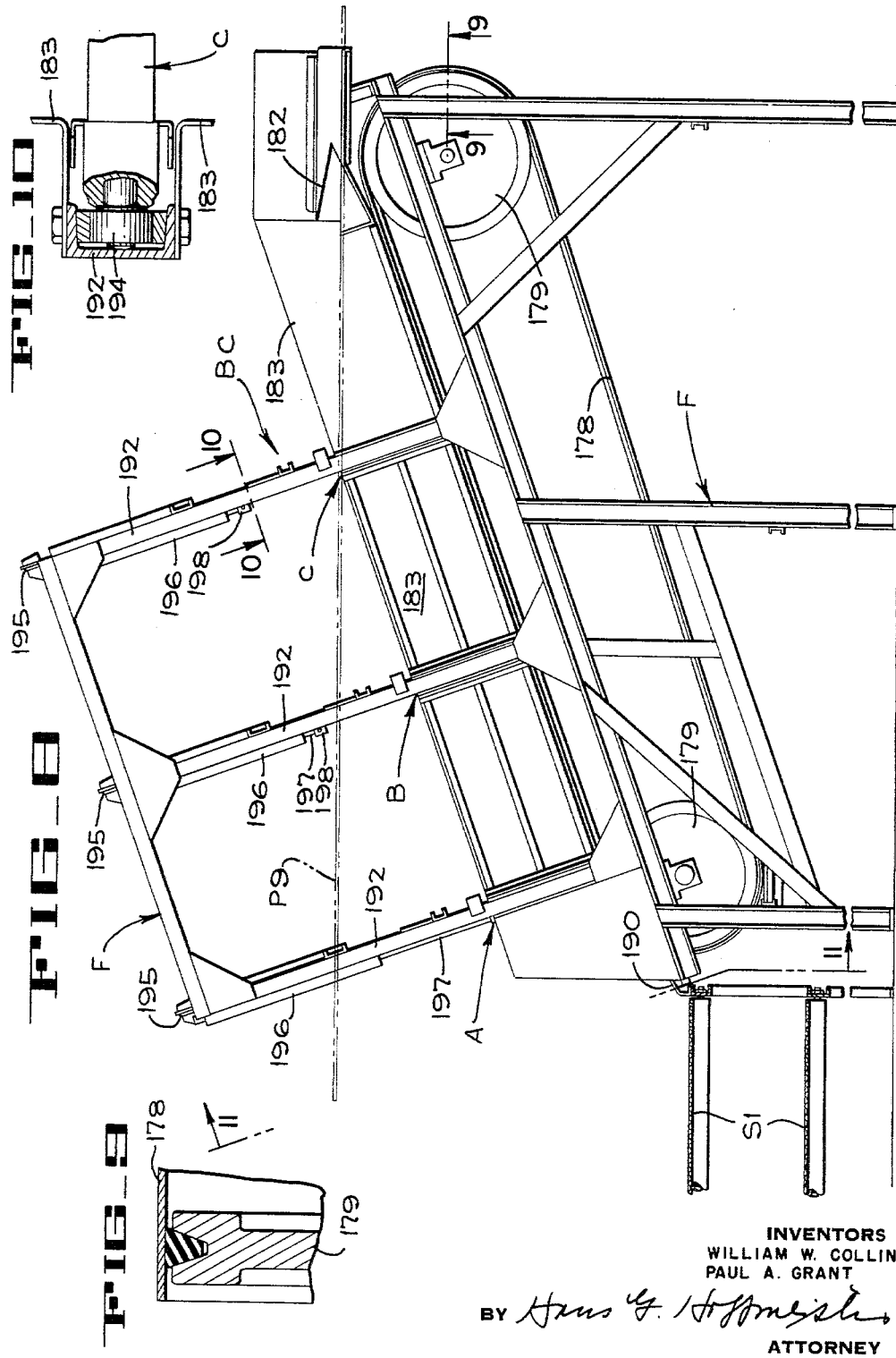

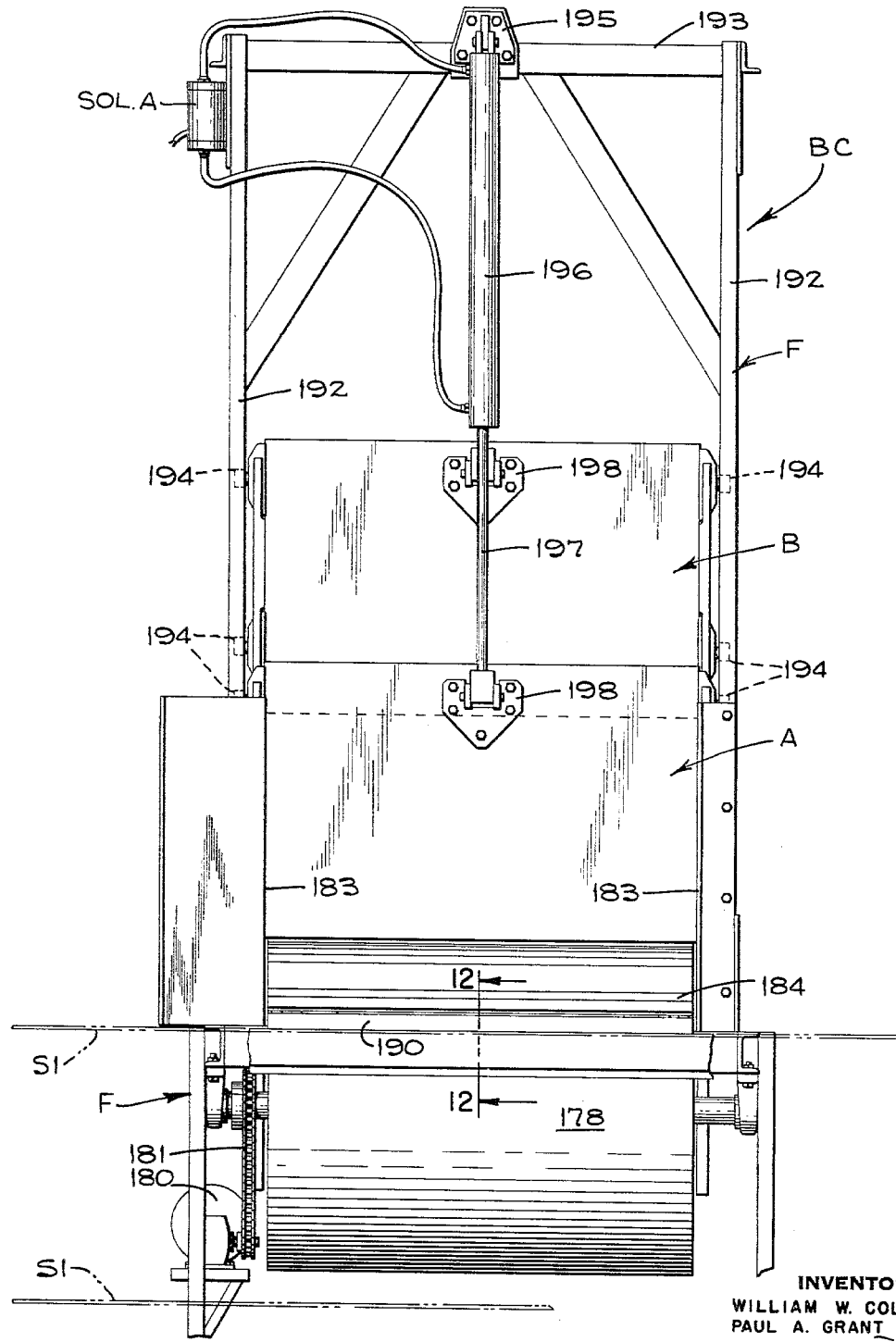

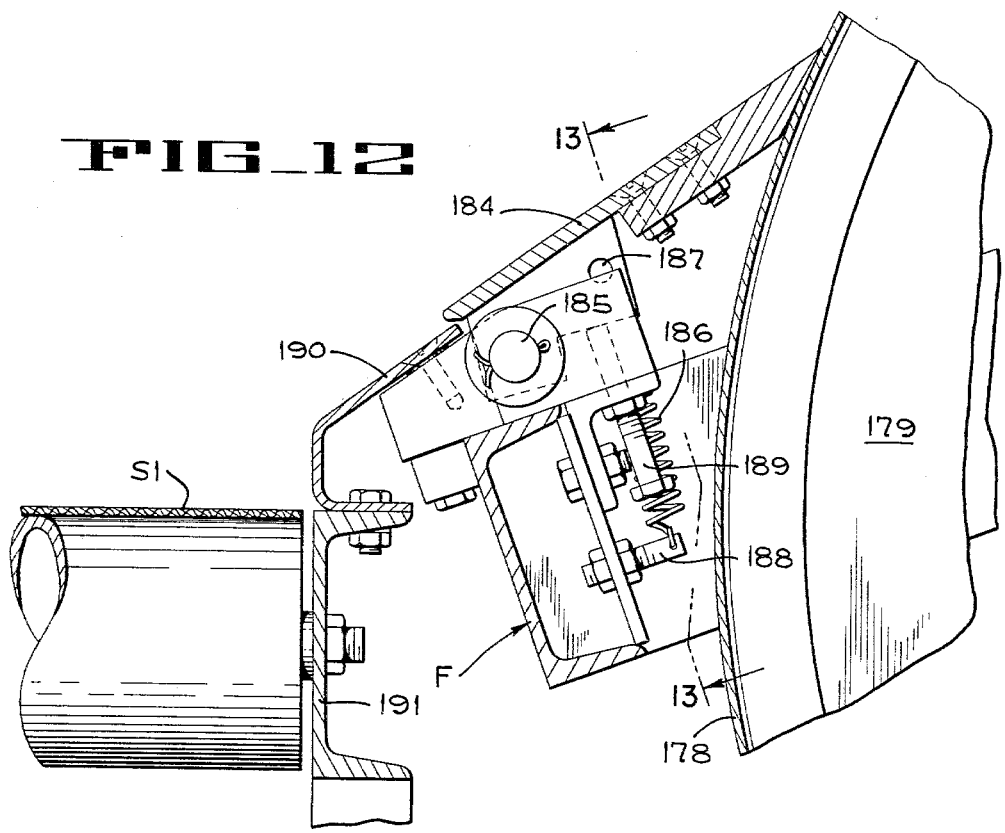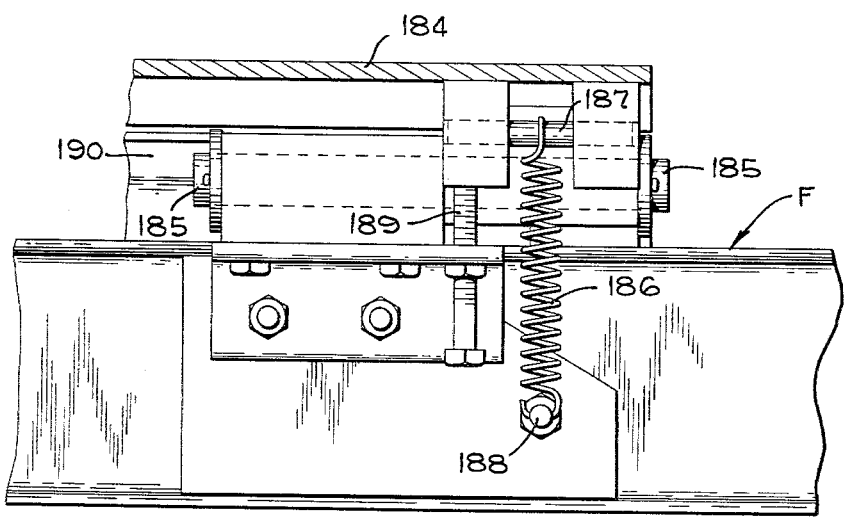

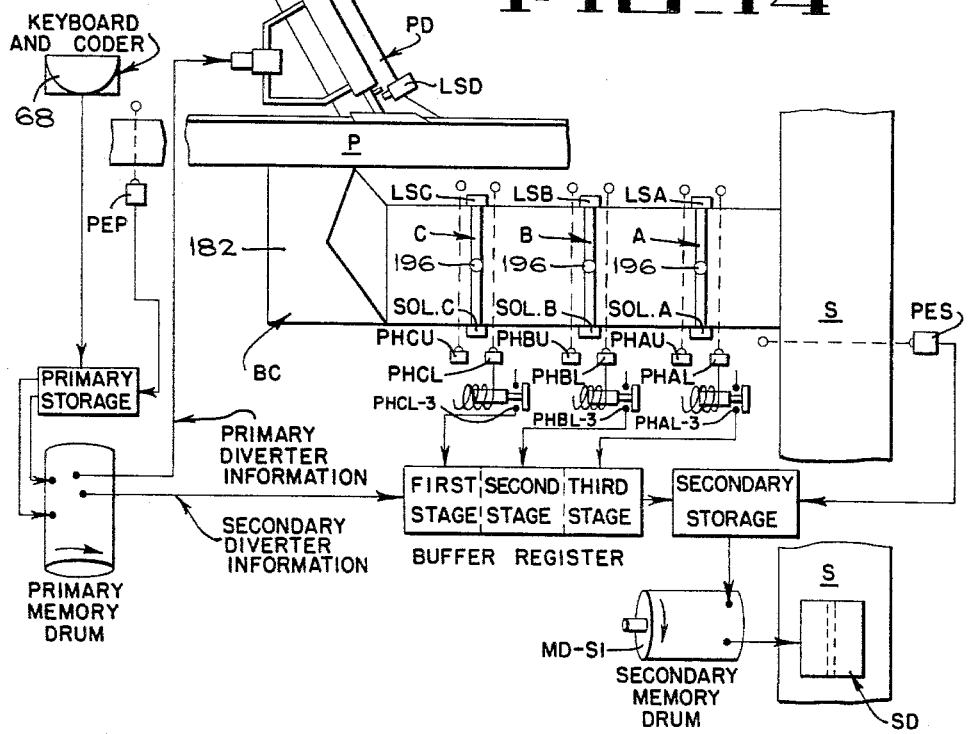
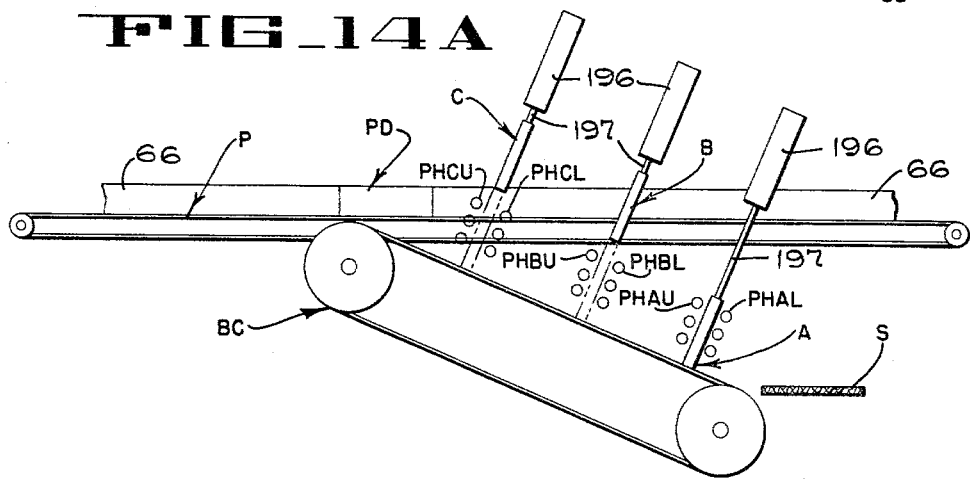

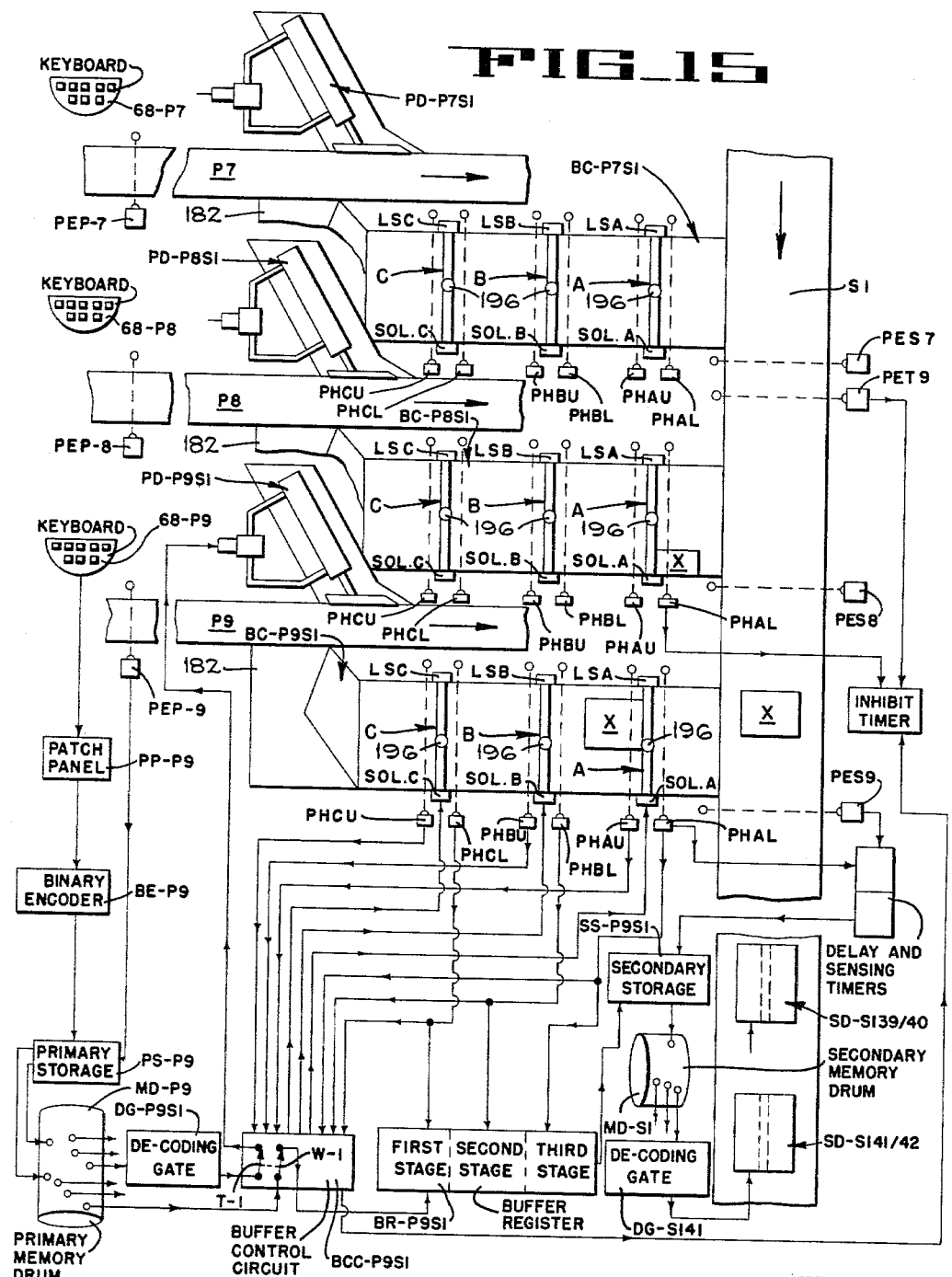

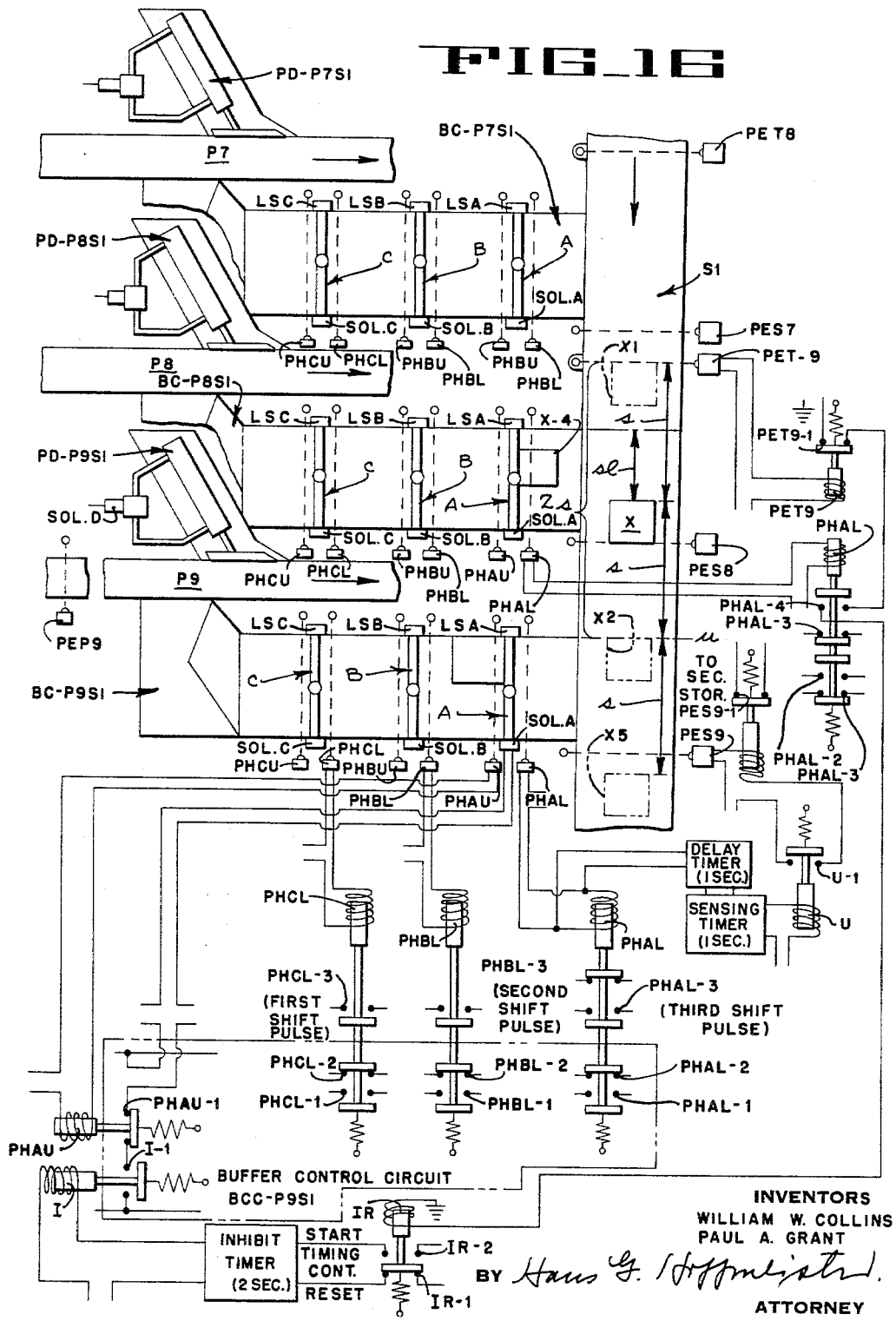

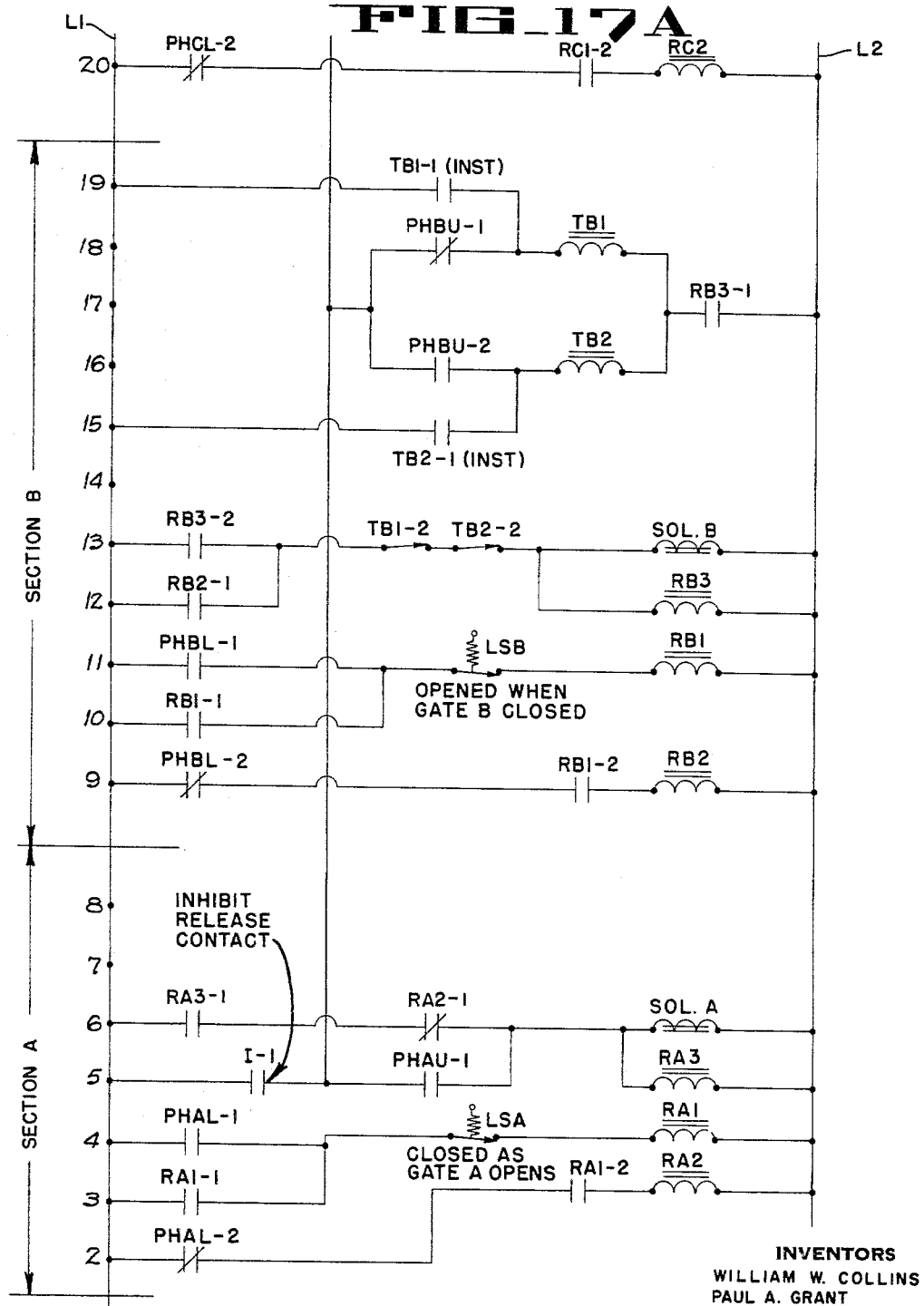

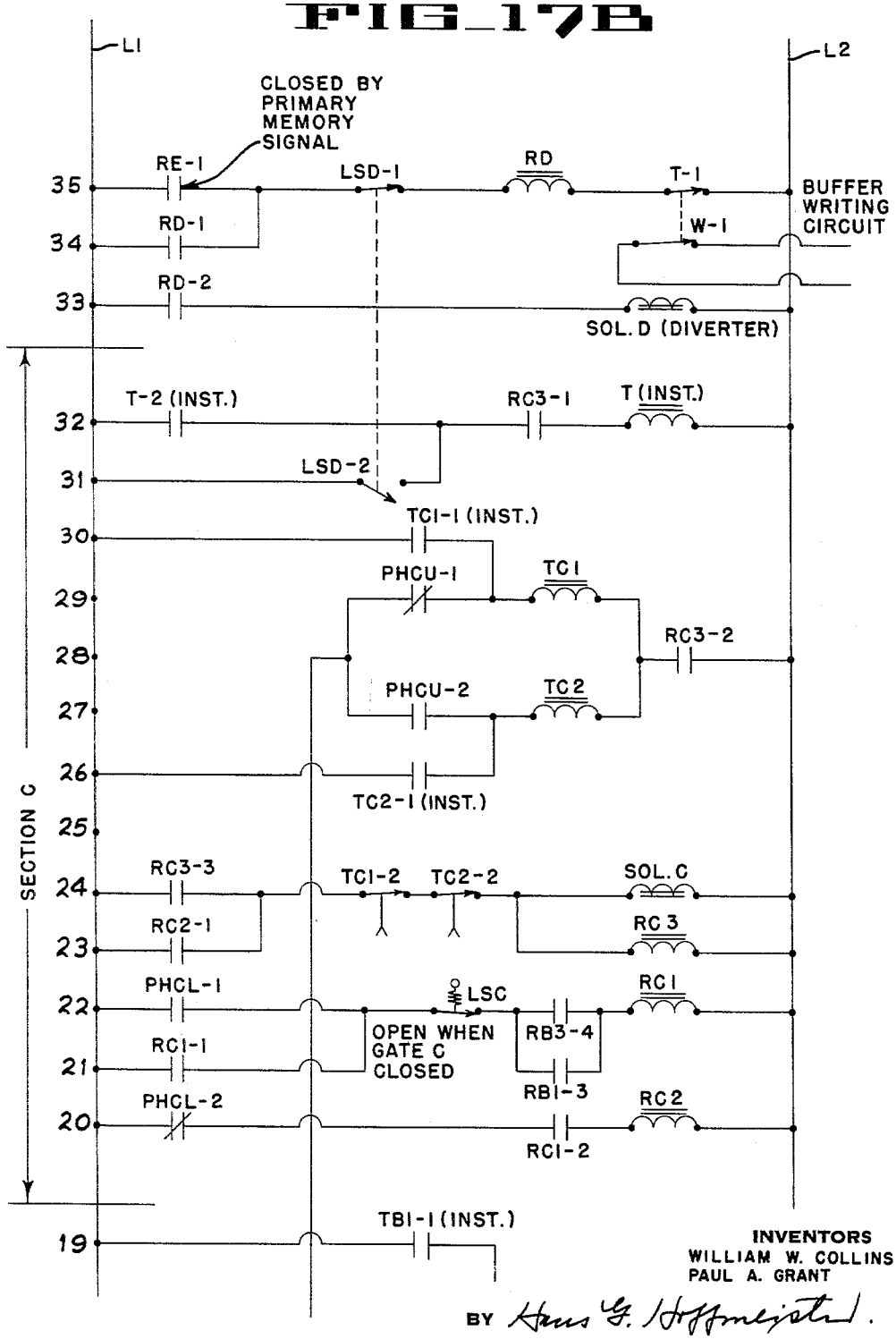

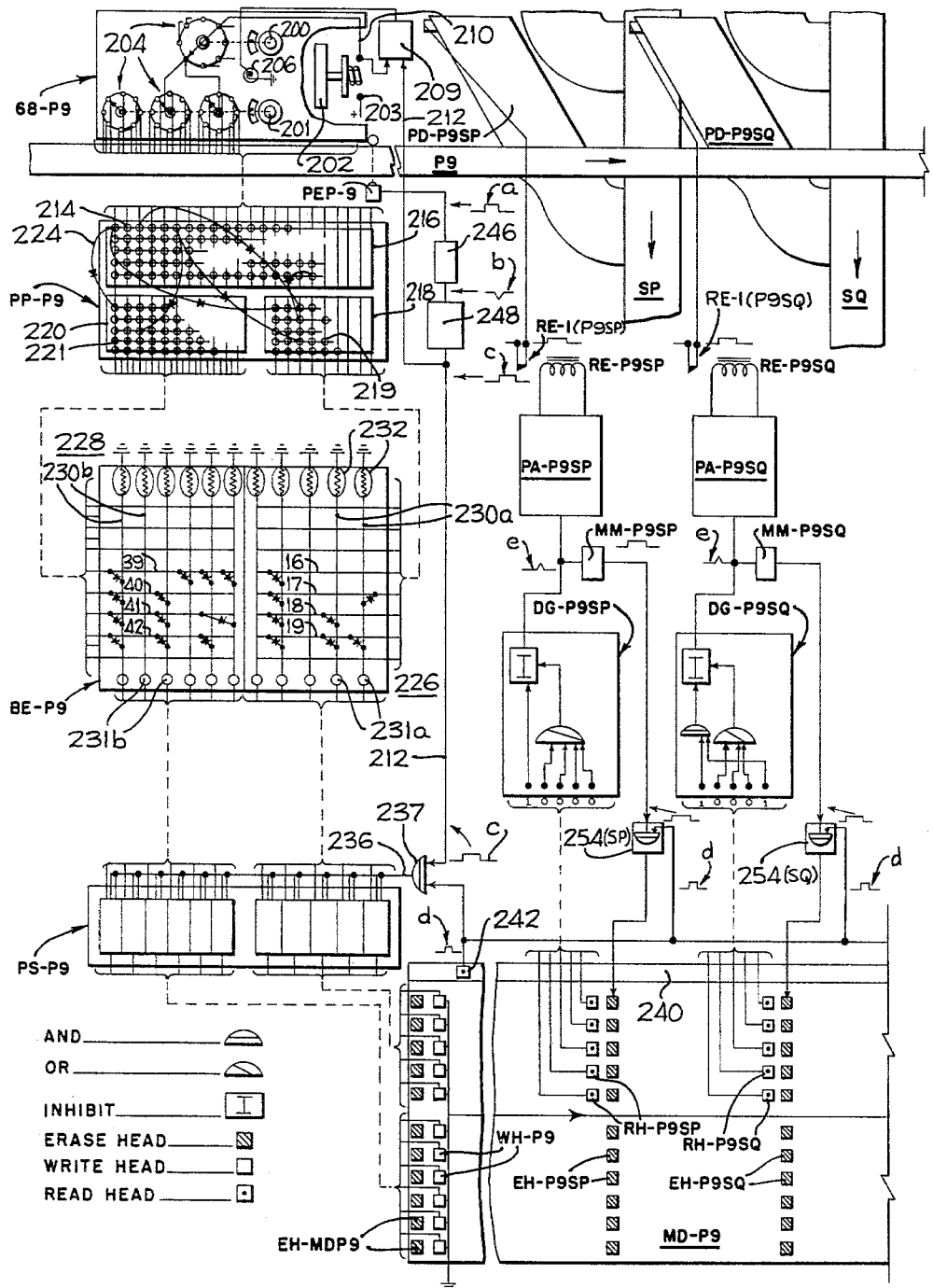

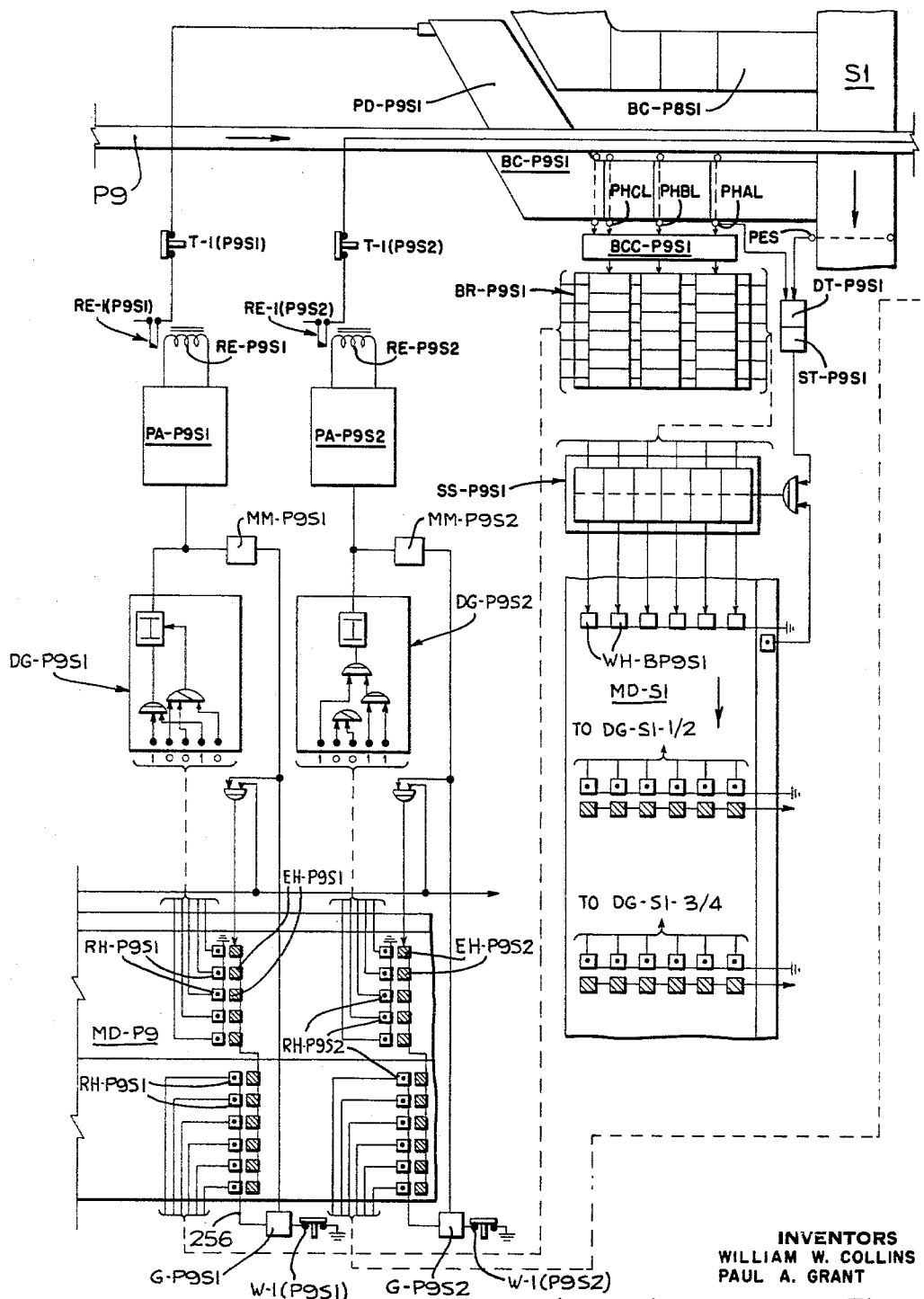

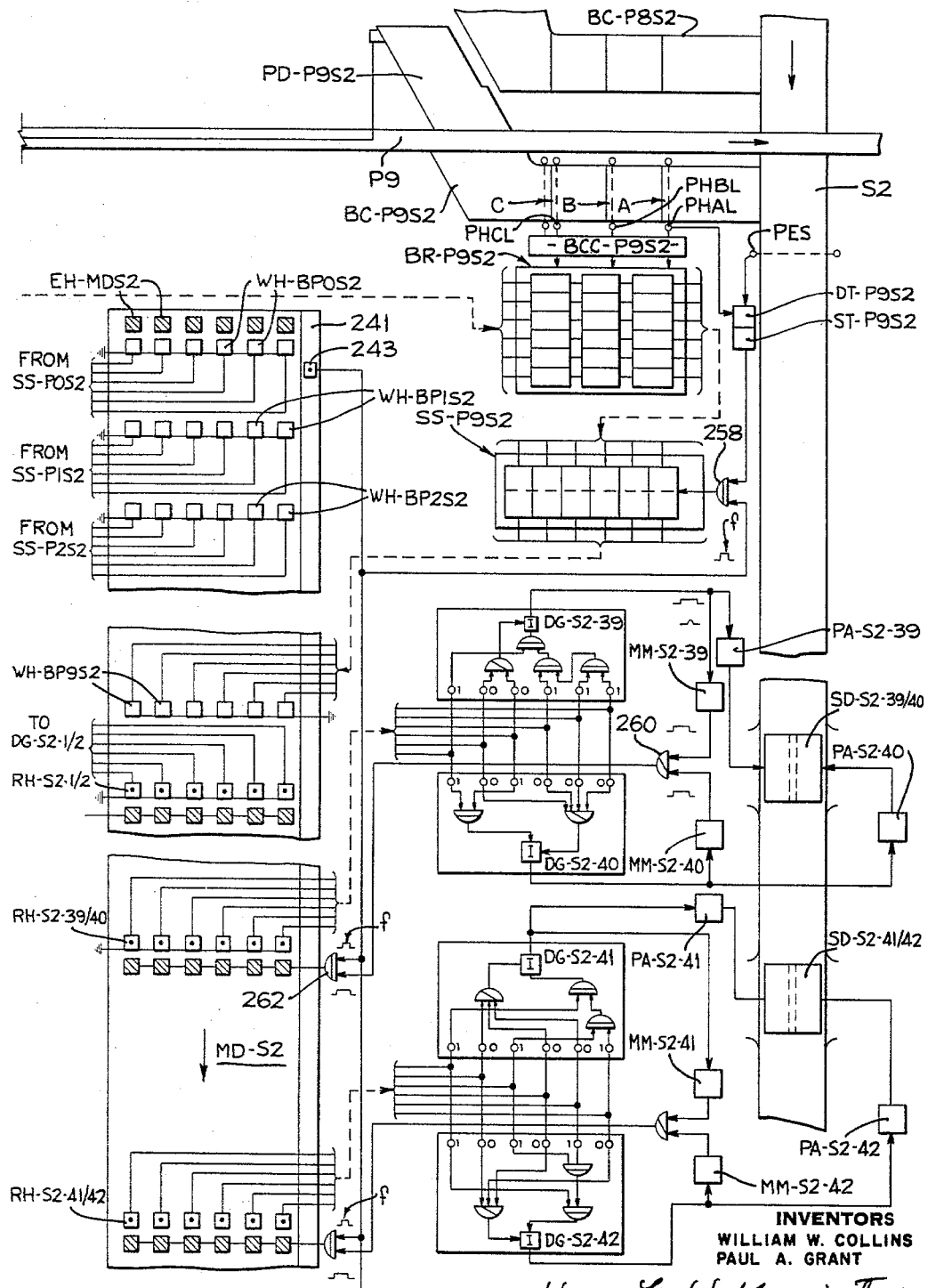

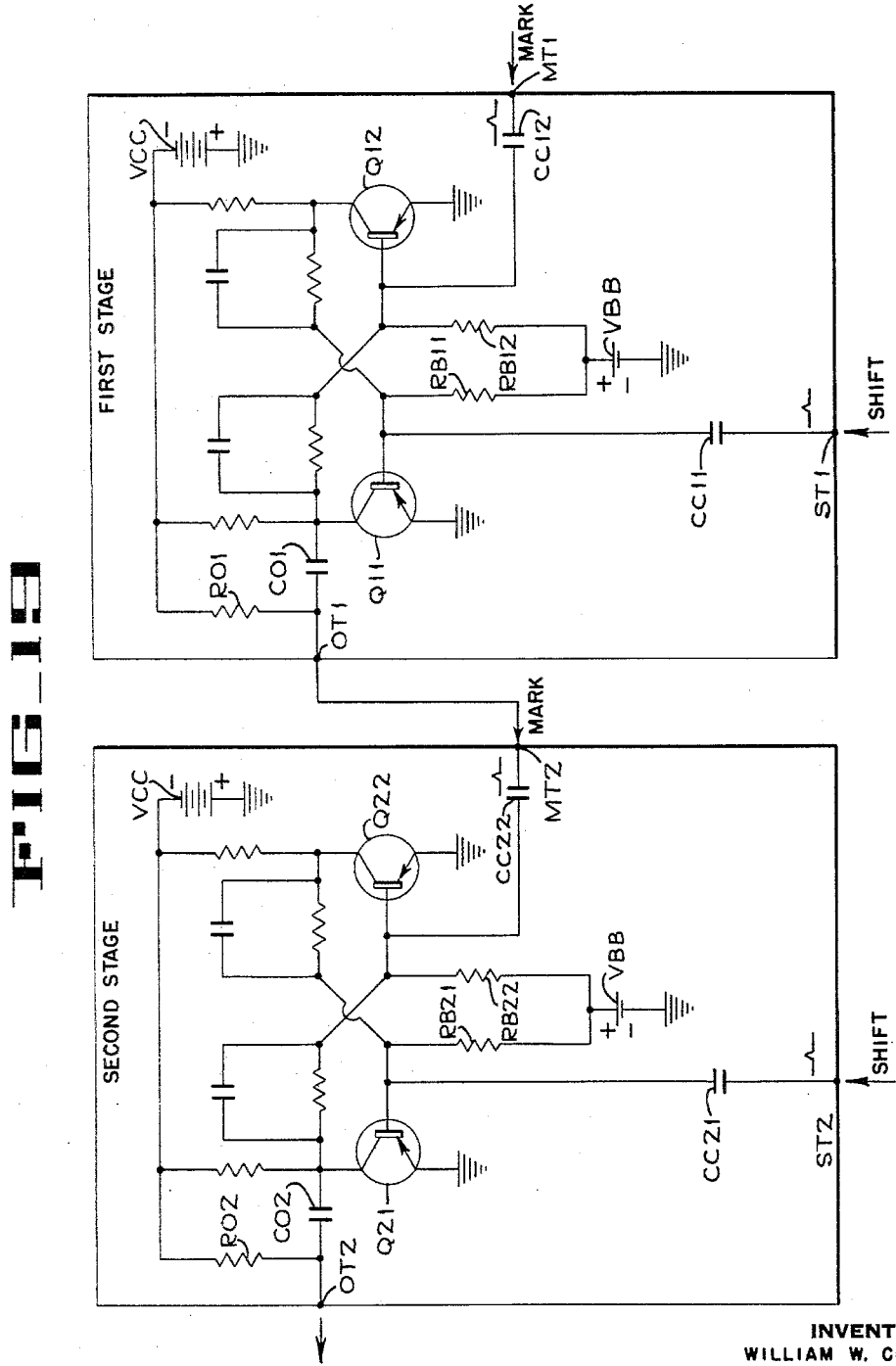
FIG_19

United States Patent Office 3,252,595
Patented May 24, 1966

3,252,595
ARTICLE SORTING SYSTEM
William W. Collins, San Jose, and Paul A. Grant, Campbell, Calif., assignors to FMC Corporation, San Jose, Calif., a corporation of Delaware
Filed Apr. 30, 1962, Ser. No. 190,889
9 Claims. (Cl. 214—11)

This invention relates to article sorting systems. More specifically, the form of the invention to be described relates to an article sorting system of the type which may be referred to as a "matrix" system. In such a system, articles are independently operator-fed to each of a number of primary conveyors, and their utilimate destination is entered into the system control. The articles are automatically transferred to any one of a number of secondary conveyors. Finally, in the system of the present invention, the articles on the secondary conveyors are in turn diverted to one of a number of destinations or zones disposed along the secondary conveyors, and the articles are individually directed to their destinations or zones in accordance with assignments made by the operator at the originating primary conveyors.

It is an object of the present invention to make possible the placement of articles having various destinations on any of a number of primary conveyors, followed by the transfer of the articles to an appropriate one of a number of secondary conveyors, and the transfer of articles from each secondary conveyor to the appropriate one of a number of preassigned destinations or zones along each secondary conveyor.

An object that is a corollary to the above is that of keeping track of each article during its travel from a coding operator at the input station of each primary conveyor to its final destination along an assigned secondary conveyor.

Another object is to both keep track of the articles and to prevent a primary conveyor from discharging articles into spaces on a secondary conveyor that are occupied by parcels discharged from an upstream primary conveyor. In accordance with the present invention a buffer storage device is provided at the transfer zones between the primary and secondary conveyors whereby articles can be held up or stored in case of incipient interference of the type mentioned above.

Another object is to keep track of the articles throughout their entire course in the system including their passage through the temporary or buffer storage units just referred to.

A further object is to inhibit release of articles from the storage or buffer conveyors to the associated secondary conveyors until suitably placed vacant spots on the secondary conveyors are available.

It is also an object of the present invention to maintain a predetermined minimum spacing between articles on the secondary conveyors, even though the articles are not uniform in size. This spacing must be sufficient to prevent interference of secondary article diverters at the assigned article destinations along each secondary conveyor, with articles on the same secondary conveyor that are approaching or leaving the aforesaid assigned secondary article conveyor diverters.

A further object is to minimize the spacing required between the primary conveyors of the system.

Another object of the present invention is to provide efficient utilization of the length of the secondary conveyors available to receive articles from the primary conveyors, while maintaining the required minimum spacing to prevent interference at the secondary article diverters as referred to above.

Still another object of the invention is to permit each operator at the feed station for his primary conveyor to pace the transfer of incoming articles to the primary conveyor, in accordance with the time required to read and code the article destination, or the article facing time.

The manner in which these and other objects and advantages may be attained will be apparent from the following detailed description and the accompanying drawings, in which:

FIGURE 1 is a fragmentary diagrammatic plan of the system of the present invention adapted to post office requirements, with some of the conveyors omitted.

FIGURE 2 is a fragmentary diagrammatic vertical section taken on line 2—2 of FIGURE 1.

FIGURE 3 is a fragmentary diagrammatic vertical section taken on line 3—3 of FIGURE 1.

FIGURE 4 is a diagrammatic perspective of several feed stations at the primary conveyors.

FIGURE 5 is a diagrammatic plan of a feed station for a primary conveyor, including a primary diverter for transferring articles to a secondary conveyor that does not require buffer storage.

FIGURE 6 is a diagrammatic perspective of a portion of a secondary conveyor with secondary diverters and destination slides stationed along the secondary conveyor.

FIGURE 6A is a diagrammatic longitudinal vertical section taken through one of the secondary diverters of FIGURE 6.

FIGURE 6B is a diagrammatic vertical section taken on line 6B—6B of FIGURE 6A.

FIGURE 7 is a perspective of a plurality of buffer conveyors at the intersection of primary and secondary conveyors.

FIGURE 8 is a side elevation of a buffer conveyor.

FIGURE 9 is a fragmentary section taken on line 9—9 of FIGURE 8 showing a portion of the buffer conveyor drive.

FIGURE 10 is a fragmentary section taken on line 10—10 of FIGURE 8 showing a mounting for the buffer conveyor gates.

FIGURE 11 is an end view of a buffer conveyor, looking along line 11—11 of FIGURE 8.

FIGURE 12 is a vertical section through the delivery apron of a buffer conveyor, taken along line 12—12 of FIGURE 11.

FIGURE 13 is a fragmentary section taken on line 13—13 of FIGURE 12.

FIGURE 14 is a schematic diagram showing a buffer conveyor at the intersection of a primary and a secondary conveyor. The figure also shows a highly simplified diagram of the control system.

FIGURE 14A is a schematic side elevation of a buffer conveyor at the intersection of a primary and a secondary conveyor.

FIGURE 15 is a diagrammatic plan of the system showing a single secondary conveyor and more than one primary conveyor. The control for the system is shown in simplified block diagram form.

FIGURE 16 is a diagrammatic plan like that of FIGURE 15, showing the inhibit release and article sensing circuits at a secondary conveyor.

FIGURES 17A and 17B form a composite wiring diagram of the internal buffer conveyor control circuit.

FIGURES 18A–18C are diagrams which when placed side-by-side form a complete diagram of the control system of the entire machine of the present invention.

FIGURE 19 is a circuit diagram of a bistable multivibrator suitable for use in the storages and registers.

*General description of the apparatus*

The system and apparatus to be described and illustrated as embodying the invention, will be one that is especially adapted for post office use in connection with the mechanized sorting of parcels. It is to be understood that although reference will be made to the sorting of parcels, and to certain considerations relative to the arrangement of the units of the system which relate to post office problems, such descriptions are presented only by way of example. The invention is in fact capable of utilization for sorting articles of almost any type and in many environments, such as warehouses, large scale manufacturing operations, and the like.

Referring to FIGURES 1 to 6, the articles or parcels to be sorted by the system of the present invention will be designated generally by the letter X. The articles or parcels are introduced into the system by a delivery conveyor 50 (FIGS. 1 and 2), and the articles are selectively swept off the delivery conveyor by operation of one or more of a series of distribution or diverter gates 52. Each diverter gate 52 directs articles to an associated input slide 54, flanked by guides 56. As best seen in FIG. 4, each slide 54 directs articles diverted thereto to an associated, endless belt type feed conveyor 58. The details and operation of the original distribution gates 52 do not form part of the invention, their only function being that of distributing articles or parcels relatively uniformly among the various induction slides 54.

As seen in FIGS. 4 and 5, at the induction station of each primary conveyor, articles or parcels leaving each feed conveyor 58 are positioned on a facing table 60 by a facing operator who orients each article so that the address or label of the article is placed in the proper position for reading. A reject chute 62 is provided for parcels that are not to be processed in the system. The facing operator places the faced articles on an endless belt feed or reading conveyor 64, which advances the articles to a coding operator. The reading conveyor is slanted downwardly and laterally toward a skirt board 66, to urge the articles against the board. Also, as seen in FIG. 5, the conveyor 64 is angled longitudinally toward the skirt board to carry articles into contact with the board. Details of the construction of a suitable reading conveyor are disclosed in the pending application of J. J. Brunner and W. W. Collins, Serial No. 190,421, filed April 26, 1962, and now Patent No. 3,181,685, assigned to the assignee of the present invention, and such details do not form part of the present invention.

A key board or designation input device 68 is provided at the reading conveyor 64, and on this device the coding operator enters the destination information for each parcel for ultimate transfer into the automatic control for the sorting system. In order that the operator has ample time to code each destination, without wasting time on easily coded destinations, the reading conveyor 64 can be paced by the operator by his control of a variable speed drive motor 70, in response to operation of a foot pedal 72. After the labels or destintion of the articles have been coded by the coding operator, the reading conveyor 64 transports the articles to the associated primary conveyor P. Here the articles interrupt the beam of a photo sensor unit PEP, which enters the article destination information into an analog memory. In the following description the term sensor will be used to indicate a photo-electrical unit, and the relays and electronic circuitry associated with the cell.

The facing operator insures that the parcels are spaced on the reading conveyor by some minimum distance such as two feet, for example. The primary conveyor P has a higher linear speed than that of the reading conveyor 64, and hence increases the article spacing, to a distance of four feet, for example, in order to make possible individual diversion of the parcels from the primary conveyors, without interference with other parcels. Referring now to the plan of FIGURE 1, in the system illustrated there are ten primary conveyors P, that are individually designated P0–P9. In the following specification, the letter P will be reserved for the general indication of any one of the primary conveyors.

Referring to FIGURES 1 and 5, it can be seen that a number of secondary conveyors intersect each primary conveyor. In the post office system presented as an example of the present invention, there is a first group of secondary single-destination conveyors designated Sa, Sb, Sc, Sd, and there is a second group of secondary, multiple-destination conveyors designated S1 to S6, conveyor S4 being omitted in FIGURE 1. In the following description the letter S will be used to refer to secondary conveyors generally. At the intersection of each primary conveyor with a secondary conveyor, a primary parcel diverter PD is provided, which diverts articles from the primary conveyors for transfer to the assigned secondary conveyor, in accordance with the destination code. The details and operation of a suitable primary diverter PD are disclosed in the above-mentioned application of Brunner and Collins, Serial No. 190,421, filed April 26, 1962, now Patent No. 3,181,685.

Since all of the articles on the secondary conveyors Sa to Sd run out to the end of their respective secondary conveyors, all that is required for transfer to this group of secondary conveyors is a transfer chute 74, which receives articles from the associated primary diverter PD, and directs them onto the assigned secondary conveyor Sa to Sd, as the case may be.

To amplify explanation of the use of the parcel sorting system of the present invention in a post office installation, secondary conveyors Sa (of which there will be several) may be employed for the disposition of what the Post Office Department terms "low density" parcels, that are to be manually sorted geographically. This designation could correspond, for example, to villages near the post office in which the system is installed.

Secondary conveyors Sb (of which there may be one or more) will receive the highest density parcels for direct distribution to a single destination. This could geographically correspond to a nearby large city, or to New York City, for example.

Secondary conveyors Sc may be used for direct distribution of high density parcels that are dispatched without sorting. Large cities in other states provide exampels of this type distribution. There may be one secondary conveyor Sd that is employed for receiving parcels that are rejected because they are oversize, or that have other objectionable features, or cannot be coded.

At the intersection of each primary conveyor P0–P9 and each secondary conveyor S1–S6, a buffer conveyor or buffer storage device BC is provided. These buffer conveyors, which will also be referred to as "buffers," receive articles or parcels diverted from the associated primary conveyor by the associated primary diverter PD, and release the parcels to the associated secondary conveyors S1 to S6, as the case may be. The buffers can store up to three parcels, and as will be explained in detail presently, the system control operates in conjunction with the buffers so that the buffers enable the control system to keep track of the passage of parcels during transfer from the primary to the secondary conveyors, regardless of the number of parcels in transit through the buffers.

When the parcels are released from the buffer conveyors, they are longitudinally centered on the secondary conveyors by parcel centering baffles. Also, the secondary conveyors are troughed somewhat to maintain tubular parcels at substantially the center line of the secondary conveyors.

Spaced along each secondary conveyor S is a series of double acting secondary diverters SD, which are operated by the system control, to divert articles to a left slide 76 or to a right slide 76a, for sacking out at sacking-out stations 78 or 78a. Continuing the geographic analogy, in a typical installation each secondary conveyor S can correspond to a medium density destination such as large cities that are out of the state, or to a smaller state or states. The individual sack-out stations can represent an individual city in one or more of the states represented by a secondary conveyor. In a post office system there may be a large number of secondary diverters at each secondary conveyor, and since each secondary diverter is double acting, it will have individual dual designations, such as SD1, 2; SD3, 4; and the like up to and including SD51, 52.

One form of the parcel diverting apparatus SD includes a housing 112 defined by a pair of generally triangular-shaped end plates 113 and 114 and by a pair of side walls 115 and 116 which are rigidly secured in parallel spaced relationship by an upper spacer 117 and side spacers 118 and 119. Inwardly of the side plates 113 and 114, a pair of vertically extending plates 120 and 121 are rigidly secured to the side spacers 118 and 119. The housing 112 is supported above the secondary conveyor S by a frame structure 122.

A pivot shaft 123 is journalled in the plates 113 and 114 near the upper end of the housing 112 and has a pair of inwardly opening channel shaped upper links 124 and 125 secured thereto. Each link 124 and 125 slidably receives an upper slide block 126 and a lower slide block 127. The slide blocks in the link 124 are connected to a rigid bar 128 (FIG. 6A) which is pivotally secured at its upper end to one end of a cross shaft 129. The lower end of the bar is pivotally connected to a crank connector 131 which is connected by a pin 132 to an elongated resilient strap 133. Similarly, the slide blocks in the channel link 125 are connected to a rigid bar 134 which is pivotally secured to the other end of the cross shaft 129 and to a crank connector 136 which is connected by a pin 137 to an elongated resilient strap 138. The upper ends of the straps 133 and 138 are slidably received in slots 139 and 141, respectively, in the shaft 129, and the lower ends of the resilient straps 133 and 138 are slidably received in slots 142 and 143, respectively, formed in pivot pins 144 and 146. The pins 144 and 146 are journalled in a pusher plate 147 thereby pivotally connecting the lower ends of the straps 133 and 138 to the pusher plate. Frusto-conical slots 148 (only one being shown in FIG. 6B) are provided to receive the lower ends of the straps and to permit a limited amount of pivotal movement of the pusher plate 47 relative to the straps.

In order to prevent the pusher plate 147 from sliding off the lower end of the straps 133 and 138, connecting links 151 (FIG. 6A) are secured to the ends of the plate 147 and each link is slidably received in a tubular guide 152 which is pivotally connected to the associated crank connector 131 or 136 by straps 153 which are welded to the tubular guides. A cam follower 154 is connected to the upper end of each link 151 by a stub shaft 156. It will be apparent that the engagement of each stub shaft 156 with the upper end of the associated tubular guide 152 will limit the amount of downward movement of the pusher plate 147 relative to the position of the crank connectors 131 and 136.

In order to provide a horizontal path of movement for the pusher plate 147 as it moves along its diverting stroke across the conveyor S, cams 158 are secured to the end plates 113 and 114 in position to be engaged by the associated cam followers 154. Springs 155 disposed between the guides 152 and the plate 147 urge the pusher plate 147 downwardly.

A drive mechanism 166 is provided in order to oscillate the pusher plate 147 from one side of the conveyor S to the other. The drive mechanism 166 comprises a reversible motor 167 which is secured to a bracket 168 that is, in turn, rigidly secured to the plate 120. A transversely extending drive shaft 169 is mounted for rotation in the plates 120 and 121 and is connected to the motor 167 by a chain drive 170. Crank arms 171 and 172 (FIG. 6A) are secured to opposite ends of the shaft 169 and are pivotally connected to the aforementioned connectors 131 and 136, respectively. It will be understood that the pusher plate 147 will normally be positioned at top dead center of its path of travel as indicated in phantom lines (FIG. 6B), and that a diverting stroke will begin when power is directed to the motor 167 which will cause the motor to drive the pusher plate 147 through one complete revolution in a predetermined direction.

In the operation of the diverting apparatus SD of the present invention, a signal will be sent to the motor 167 which will cause the motor to drive the crank arms 171 and 172 through one complete revolution in the desired direction when a parcel is to be diverted from the conveyor S. The crank arms 171 and 172 will act through the resilient straps 133 and 138 thereby forcing the pusher plate 147 against the parcel. The resilient straps 133 and 138 will deflect upon contact with the parcel thereby reducing the impact velocity of the plate 147. As the pusher plate 147 moves in its diverting stroke over the conveyor S, the cam followers 154 will engage the associated cams 158 to cause the pusher plate 147 to move in a horizontal path across the conveyor. As the pusher plate 147 returns to its top dead center position, the stub shafts 156 engage the tubular guides 152 to raise the plate 147 above the upper surface of the highest package to be handled by the apparatus.

Parcels need not be diverted by the secondary diverters SD but can pass completely along a secondary conveyor to a manual sort and sack out station 80 at the end of the conveyor. This station is provided to handle parcels that may be described as being "low-low density" destinations, such as small villages in a given state.

In a large system such as a major post office installation, no single coding operator at a primary conveyor can be depended upon to remember all of the codes for all of the parcel destinations that might be encountered during operation of the system. Thus if a parcel bears a destination, the code of which is unknown by a coding operator, the parcel is coded "Reject" and removed from the system as will be described presently.

Parcels coded for a buffer that is filled will not be diverted. Such parcels are carried along the entire length of the primary conveyor, and are discharged onto a circulation conveyor R (FIG. 1) which reintroduces such parcels back into the induction portion of the system.

By way of example, and for purposes of the detailed discussion to follow, it will be assumed that the primary conveyors P have a normal linear speed of 240 ft./min. and that the secondary conveyors S operate nominally at 300 ft./min. The buffer conveyors BC are assumed to be on 7½ foot centers, and the secondary diverters are on 6 foot centers, with 30 inch blades. Maximum parcel length is to be 34 inches. This completes the general description of the apparatus of the system, and reference will now be made to mechanical details of the buffer conveyors BC.

*Buffer conveyor construction*

Referring to FIGS. 7-13, each buffer conveyor includes a frame indicated generally at F, and parcels are carried through the buffer conveyor by a steel conveyor belt 178, which has rubber V-belts bonded to its inner surfaces as seen in FIGURE 9. The V-belts ride in pulleys 179 that are keyed to shafts rotatably mounted on the frame. One of the pulley shafts is driven by a drive motor 180 (FIG. 11) and chain and sprocket drive mechanisms 181. Each buffer conveyor is provided with an input receptacle or chute 182, for receiving parcels diverted by the associated primary diverter PD. The parcels are guided by side rails 183 (FIG. 7) and leave the buffer conveyor by passing over a pivoted delivery apron 184 (FIGS. 12 and 13). The delivery apron is mounted on frame F of the buffer conveyor by pivot pins 185 and is urged into wiping relation with the steel conveyor belt by an apron spring 186, connected between a spring pin 187 on the apron and a spring post 188 on the frame. An adjustable stop 189 is threaded into frame F and has an end portion against which the gate abuts for determining the operating position of the delivery apron 184. Referring to FIGURE 12, each secondary conveyor S has a frame indicated generally at 191 which mounts a stationary apron 190 that forms a continuation of the pivoted apron 184.

In the system to be described, each buffer conveyor BC includes three gates, namely gates A, B and C (FIG. 7). In order to mount the gates, upwardly projecting tracks 192 are provided, said tracks being connected by cross rails 193. As seen in FIGS. 10 and 11, the gates are mounted on rollers 194 that ride in the tracks 192. Each gate is provided with a pneumatic operating mechanism. As seen in FIG. 11, a mounting bracket 195 is connected to the cross rail 193 disposed above each gate. Pivoted to each bracket 195 is a gate operating cylinder 196, and the piston rod 197 of the gate operating cylinder is pivoted to a bracket 198 secured to the associated gate.

The operating cylinders 196 for the gates are controlled by solenoid actuating valves of the conventional four way, or reversing construction, and together with their solenoids these valves are designated SOL. A, B and C, respectively.

Associated with each of the gates A, B and C are limit switches LSA, LSB and LSC, which are opened and closed by operation of the gates in the manner to be described presently. A pair of photo sensor units is associated with each gate. Thus there is a photo sensor unit PHCU upstream of gate C and another unit PHCL downstream of gate C. Similarly, photo sensors PHBU, PHBL are provided at gate B, and PHAU, PHAL photo sensors are provided at gate A. The photo sensor units have been omitted from FIGURES 8 and 11 for clarity. The photo sensor units appear diagrammatically in FIGURE 7, which drawing indicates a single photo sensor unit at each side of each gate.

General description of buffer conveyor operation

*The Photo Sensors.*—The mechanical construction of the buffer conveyors has been described and a general description of the operation of the buffer conveyors BC relative to the basic system will now be presented. This will be followed by a detailed description of the control circuit for the individual buffer conveyors.

Referring to FIGURES 14 and 14A, the photo sensors disposed at each of the three buffer conveyor gates are indicated. As previously described, photo sensor PHCU is above or upstream of gate C, and photo sensor PHCL is below gate C. Similarly photo sensors PHBU, PHBL and PHAU, PHAL, are provided at gates B and A, respectively. Solenoid units SOL. A, B and C are provided for operation of four-way valves which control pneumatic gate cylinders. The photo sensors referred to have two distinct major functions. One function is that of causing the buffer conveyor to be automatic in its internal operation, so that parcels are automatically stepped from gate to gate as they enter the buffer conveyor from the primary diverter. Photo sensors PHCL, PHBL, PHAL also function to provide pulses into a memory, which will be designated as a buffer register, so that the latter can trace the passage of each parcel through the buffer, for eventual transfer of the secondary diverter or destination information to a secondary memory drum that is an analog memory for the secondary conveyor associated with the buffer. The photo sensor unit PHAL at gate A of an upstream buffer has at least one other function, namely that of preventing the next downstream buffer from releasing a parcel onto the same portion of the secondary conveyor that will be occupied by the parcel released by the upstream buffer, which has just broken the light beam to its sensor PHAL. The manner in which this minimum parcel spacing along the secondary conveyor belts is established will be described in more detail presently, relative to FIG. 16.

Relation of the buffer conveyor to system operation and control

The basic function of the buffer conveyor structure thus far described relative to the overall system can be seen in its simplest form in FIG. 14. Referring to that figure, the coding operator enters the parcel destination information into his keyboard, and as illustrated in FIGURE 14 the keyboard includes a coder unit which sends the parcel destination information to primary storage.

When a given parcel breaks the beam of a photo sensor PEP at the input station of the primary conveyor P, the parcel destination information is called out of primary storage and written onto a primary memory drum, which is turning at an analog speed of the primary conveyor. When the parcel reaches the designated primary diverter PD, a primary diverting signal is sent by the primary memory drum to the primary diverter, causing the parcel to be transferred into the associated buffer conveyor BC. Simultaneously, the secondary diverter (ultimate destination) information for the associated secondary conveyor S is sent from the primary memory drum to the first stage of a buffer or shift register, that is controlled by the buffer conveyor. When the parcel is diverted from the primary conveyor in response to a signal to the primary diverter from the primary memory drum the parcel enters the buffer conveyor. Normally, gate C will be open, and when the parcel passes through gate C the relay of photo sensor PHCL is activated by the breaking of its beam. PHCL now sends a first shift pulse to the first stage of the buffer register, which pulse transfers the secondary diverter (ultimate destination) information from the first stage to the second stage of the buffer register. This clears the first stage.

If and when gate B is opened, the same parcel breaks the beam of photo sensor PHBL downstream of gate B and a shift pulse is sent to the second stage of the buffer register. This transfers the secondary diverter (destination) information from the second stage to the third stage of the buffer register, clearing the second stage.

When the parcel is released by gate A, in response to action of an inhibit release circuit to be described in detail later, the parcel breaks the beam of photo sensor PHAL just downstream of gate A, which sends a shift pulse to the third stage of the buffer register, and transfers the secondary diverter (destination) information from the third stage to the last stage, which has been given the designation secondary storage.

When the parcel just released by gate A, and deposited on the secondary conveyor S, first breaks and then restores the beam of photo sensor PES (which is just downstream of the buffer conveyor) the secondary diverter information is called out of secondary storage (which is functionally the last buffer register stage) and written onto a secondary memory drum. This drum rotates at analog speed with the secondary conveyor S. When the parcel reaches the assigned secondary diverter, the secondary memory drum and associated circuitry sends a diverting signal to the assigned secondary diverter, which sweeps the parcel from the secondary conveyor into an assigned destination lane, namely one of lanes 76, or 76a (FIG. 1).

A detailed description of a buffer conveyor control circuit will now be presented, which will be followed by additional descriptions of how the circuit fits into the over-all control pattern of the complete system. Since all of the buffer conveyors are alike, corresponding photo sensors, solenoids, and the like associated with each buffer are given the same general reference characters.

Detailed description of buffer conveyor control circuit

Reference is now made to the composite circuit diagram of FIGS. 17A and 17B, and to the schematic diagram of FIGS. 14 and 14A. In FIGS. 17A and 17B, the relay coils, contacts, etc., are shown connected between lines L1 and L2, in circuits numbered as 2–37 at line L1, which circuit numbers will be indicated in parentheses after the designated electrical components.

*Filling of the buffer conveyor*

Assume that the buffer conveyor is empty. In this case, gate A will be closed, and gates B and C will be open. This condition results from the connections of solenoids of solenoid valves SOL. A (6), SOL. B (13), and SOL. C (24) to the valves controlling the gate air cylinders. When solenoid SOL. A is de-energized, gate A is closed, whereas when solenoids SOL. B and SOL. C are de-energized, gates B and C are open.

(1) When the primary memory output energizes a relay RE (FIG. 18B), contact RE–1 (35) is closed, energizing diverter relay RD (35) which closes holding contact RD–1 (34). Contact RD–2 (33) is also closed, energizing SOL. D (33) which actuates the primary diverter. The first parcel is diverted to the buffer conveyor (which will be called the "buffer" in this current description) by the associated primary diverter PD, the parcel passes through open gate C, and breaks the light beam of photo sensors PHCU and PHCL (FIG. 14). Photo sensor PHCU has no function at this time, but as will be seen, photo sensor PHCL does have a function. In the interest of brevity, the term "photo sensor PHCL," or merely "PHCL," for example, may include the lamp, the photosensitive detector, an amplifier if the detector requires one, and a relay.

The relay of PHCL, downstream of gate A is now energized, opening normally closed contact PHCL–2 (20), in the circuit of relay RC2 (20), and closing normally open contact PHCL–1 (22) (FIG. 17B) in the circuit of relay RC1 (22). The photo sensor contacts are of the sequential operating type.

However, this closing of contacts PHCL–1 (22) by the first parcel does not energize relay RC1 (22). Relay RC1 (22) is provided to respond to the passage of a parcel through gate C, either when gate B is closed, or when gate B is open and there is a parcel passing through gate B. Thus relay RC1 (22) is not energized as the parcel passes through gate C, and as a result relays RB3 (12) and RB1 (11) are de-energized, so that normally open contacts RB3–4 (22) and RB1–3 (21) in the circuit of relay RC1 (22) remain open. Interruption of the beam of PHCL as the first parcel passes through the gate C also closes contacts PHCL–3 (FIG. 16) wich sends a shift pulse to the first stage of the buffer register (FIG. 14), transferring the secondary diverter information for the first parcel from the first to the second stage of the buffer register. (As will be explained later, this secondary diverter information was transferred from the primary memory driven to the first stage of the buffer register at the same time that the first parcel reached the primary diverter, and was diverted to the buffer by another signal from the primary memory drum).

(2) When the first parcel passes through gate B, which is still open, the parcel breaks the light beam of photo sensor PHBL, downsteam of gate B. The relay of photo sensor PHBL is now energized, closing normally open contact PHBL–3 (FIG. 16) which sends a shift pulse to the second stage of the buffer register (FIG. 14) to transfer the parcel destination (secondary diverter) information from the second stage to the third stage of the buffer register.

Simultaneously, energization of photo sensor PHBL by the first parcel also opens normally closed contact PHBL–2 (9) in the circuit of relay RB2 (9), and closes normally open contact PHBL–1 (11) in the circuit of relay RB1. Since the normally closed limit switch LSB (11) is closed when gate B is open, the aforesaid closing of contact PHBL–1 (11) by the first parcel as it passes through gate B energizes relay RB1 (11). Relay RB1 now closes its holding contact RB1–1 (10) and also closes normally open contact RB1–2 (9) setting up relay RB2 (9) for energization as soon as the first parcel clears the beam of photo sensor PHBL. Energization of relay RB1 (11) also closes normally open contact RB1–3 (21), setting up relay RC1 (22), which is now under control of normally open photo sensor contact PHCL–1 (22).

The first parcel now moves into the buffer section at gate A, and gate B, which has heretofore remained open, must close soon after the parcel clears the light beam of photo sensor PHBL, in order to block off the compartment of gate A from receiving another parcel, with attendant loss of registry.

(3) When the first parcel clears the light beam of photo sensor PHBL, the relay of PHBL deenergizes, reopening the previously closed normally open contact PHBL–1 (11) in the circuit of relay RB1 (11) thereby placing relay RB1 (11) under control of limit switch LSB (11). Limit switch LSB (11) is now closed, because gate B is still open. Deenergization of PHBL as the first parcel clears its beam also recloses the previously opened normally closed contact PHBL–2 (9) in the circuit of relay RB2 (9) which now energizes this relay. Since the relay RB1 (11) has been held energized by its holding contact RB1–1 (10), the aforesaid reopening of normally open contact PHBL–1 (11) as the first parcel clears PHBL, does not deenergize relay RB1 (11). Thus, with relay RB1 (11) energized, the reclosing of normally closed contact PHBL–2 (9) as the first parcel clears the beam of PHBL energizes relay RB2 (9), through normally open contact RB1–2 (9) which is now closed.

Relay RB2 now closes normally open contacts RB2–1 (12), which energizes relay RB3 (12) and solenoid SOL. B (13) of the four way air valve controlling gate B. On energization of solenoid SOL. B (13), the air valve reverses the air pressure in the cylinder of gate B, thus causing gate B to close. In its closed position, gate B depresses and opens normally closed limit switch LSB (11), which opens circuit 11, and hence deenergizes relay RB1 (11). Thus the previously closed normally open holding contact RB1–1 (10) for relay RB1 is reopened, and normally open contact RB1–2 (9) is also reopened, deenergizing relay RB2 (9).

Since relay RB3 (12) was energized by the closing of normally open contact RB2–1 (12) by relay RB2 (9), before the normally closed limit switch LSB (11) was opened to deenergize relay RB1 (11) by the closing of gate B, normally open contact RB3–4 (22) in the circuit of relay RC1 (22) was closed before previously closed normally open contact RB1–3 (21) in the circuit of relay RC1 (22) was opened by deenergization of relay RB1 (22). Thus, even though relay RB1 (11) is deenergized by the opening of normally closed limit switch LSB (11), in response to the closing of gate B, contact RB3–4 (22) keeps circuit 22 for relay RC1 (22) set up and ready for detection of a second parcel when it passes through gate C and breaks the beam of PHCL.

In order to hold gate B closed with the first parcel at gate A, when relay RB3 (12) was energized, its holding contact RB3–3 (13) closed, holding solenoid SOL. B and relay RB3 (12) energized. Furthermore, contact RB3–1 (17) was also closed when relay RB3 was energized, setting up circuit 17 for the time delay relays TB1 (18) and TB2 (16) under control of photo sensor PHBU at gate B.

(4) Assume now that the first parcel is retained by gate A, and hence eclipses the light beam of photo sensor PHAU behind gate A. The sensor relay of PHAU is now energized, closing contact PHAU–1 (5), which sets up the circuits of solenoid SOL. A (6) and relay RA3 (5). Gate A is now ready for receiving a release signal from the parcel spacing or inhibit release system, and if and when a release signal is generated, it closes contact I–1 (5) to signal SOL. A for release of the parcel at gate A.

However, for purposes of this description of the filling cycle, it is assumed that no release signal has been received.

(5) Assume now that a second parcel is diverted to the buffer and passes through gate C. Upon diversion of the second parcel, its secondary diverter information was transferred from the primary memory drum to the first stage of the buffer register. The first register stage was automatically cleared upon transfer of the first parcel information to the second register stage. When the second parcel breaks the light beam of photo sensor PHCL downstream of gate C, the PHCL relay is energized.

Contact PHCL–3 is again closed, (FIGS. 14 and 16) sending another shift pulse to the first stage of the buffer register, to transfer the second parcel information to the second register stage. The second register stage was also automatically cleared when the first parcel information was shifted to the third register stage.

Then the relay of PHCL is energized by the second parcel at gate C, normally closed contact PHCL–2 (20) in the line of relay RC2 (20) opens, and normally open contact PHCL–1 (22) closes, which sets up circuit 22 of relay RC1 (22), for initiating the closing of gate C.

Since the gate C limit switch LSC (22) is closed when gate C is open, and since contact RB3–4 (22) has been closed previously (see Step 3), the breaking of the light beam of PHCL by the second parcel at gate C, with the attendant closing of normally open contact PHCL–1 (22), energizes relay RC1 (22). Holding contact RC1–1 (21) for relay RC1 (22) is now closed, and contact RC1–2 (20) also closes, setting up the circuit of relay RC2 (20). Since it is assumed that the first parcel has not been released by gate A so that second parcel is to be retained by gate B, gate C must close as soon as the trailing edge of the second parcel clears the light beam of PHCL, downstream of gate C.

(6) When the trailing edge of the second parcel clears the beam of photo sensor PHCL, that is, the second parcel approaches gate B, the photo sensor relay of PHCL is deenergized, reopening previously closed contact PHCL–1 (22) in the circuit of relay RC1 (22), and reclosing previously opened contact PHCL–2 (20) in the circuit of relay RC2 (20). Since relay RC1 (22) is still held energized by its holding contact RC1–1 (21), contact RC1–2 (20) remains closed, so that the reclosing of normally closed contact PHCL–2 (20) by passage of the second parcel toward gate B (as described above) establishes circuit 20, thereby energizing relay RC2 (20). Normally open contact RC2–1 (23) will now close, energizing relay RC3 (23) and solenoid SOL. C (24) of the air valve controlling gate C. On energization of solenoid SOL. C, the air valve for gate C reverses the air pressure in the cylinder of gate C, causing gate C to close. When closed, gate C depresses limit switch LSC (22) which opens circuit 22, de-energizing relay RC1 (22). When relay RC1 (22) is de-energized, its holding contact RC1–1 (21) is opened, and previously closed normally open contact RC1–2 (20) is also opened, thereby de-energizing relay RC2 (20).

When relay RC3 (23) was energized by the second parcel leaving the beam of PHCL downstream of gate C, the holding contact RC3–3 (24) for relay RC3 (23) was closed, holding solenoid SOL. C (24) and relay RC3 (23) energized. With SOL. C (24) energized, gate C remains closed. Contact RC3–2 (28) was also closed when relay RC3 (23) was energized, thereby setting up circuit 28 of time delay relays TC1 (29) and TC2 (27). Contact RC3–2 (28) is necessary in order to de-energize the time delay relays TC1 or TC2, after gate C starts to open (see release section C).

After the closing of gate C, the buffer can receive one more parcel. The primary diverter PD, feeding parcels to the buffer, is therefore permitted to operate one more time.

(7) When the second parcel is retained by gate B, the light beam of photo sensor PHBU is interrupted. The relay of PHBU energizes, and opens normally closed contact PHBU–1 (18), which locks out the long time delay relay TB1 (18). At the same time, normally open contact PHBU–2 (16) is closed, setting up circuit 16 of the time delay relay TB2 (short delay).

Short and long time delay relays are used in the gate circuits of gates B and C in order to properly time the sequential opening of the gates. For example, gate B is controlled by either the short time delay relay TB2 (16), set for 0.2 sec. delay, or by the long time delay relay TB1 (18), set for 0.8 sec. delay, depending whether or not a parcel is being retained by gate B, at the time a release signal is given SOL. B (13). The circuit is such that each time gate B retains a parcel, the short time delay relay TB2 (16) is set up, which delays the opening of gate B until approximately 0.2 sec. after gate A opens. This short delay is sufficient to insure that gate A will not close on a parcel approaching from gate B.

If gate B does not retain a parcel, but is closed merely to exclude a parcel from occupied section A, a parcel may be approaching gate B at the same instant it is signaled to open in response to the release of the parcel at gate A. This rapidly moving parcel would then pass through gate B without being stopped or slowed down, and hence could arrive at the release gate A in a shorter than normal time, possibly before the release gate A had completely closed. This condition, which would damage the parcel, is avoided by delaying the opening of gate B by the long delay relay TB1 (18) in case gate B does not retain a parcel, but receives an open or release signal because of the release of a parcel at gate A.

(8) Assume that a third parcel is diverted into the buffer section at gate C. Upon diversion of the third parcel into the buffer, the secondary diverter information for the third parcel is transferred from the primary memory drum to the first stage of the buffer register. The first buffer register stage was cleared by the shift pulse that transferred the second parcel information (which parcel is at gate B) to the second buffer register stage.

With the third parcel diverted to gate C, and with a parcel at gate B so that gate C is closed, it is now necessary to lock out the primary diverter so long as the buffer is full. Prior to completion of each diverting stroke, the primary diverter operates a limit switch LSD (FIG. 14) which momentarily opens a normally closed limit switch contact LSD–1 (35) which in turn opens circuit 35 of the primary diverter control relay RD (35). At the same time the primary diverter operates limit switch LSD, a contact LSD–2 (31) mechanically connected to limit switch contact LSD–1 (35) is momentarily closed. This energizes a time delay relay T (32). Since normally open contact RC3–1 (32) remains closed due to the energization of relay RC3 (23) by its holding contact RC3–3 (24), closing of contact LSD–2 (31) by the diverter energizes time delay relay T (32). Time delay relay T instantly opens time delay relay contact T–1 (35), in the circuit of the diverter control relay RD (35), holding relay RD de-energized, even though the primary diverter retracts and permits contact LSD–1 (35) to reclose. Holding contact T–2 (32), for the time delay relay T (INST. 32) is closed when the relay T is energized, so that relay T (32) remains energized.

As long as the buffer is full, contact T–1 (35) in the circuit of diverter operating relay RD (35) is held open by time delay relay T (32) so that the diverter is locked out.

(9) When the third parcel is retained by gate C, the light beam of photo sensor PHCU is interrupted. The photo sensor relay energizes, opens normally closed contact PHCU–1 (29) to lock out the long time delay relay TC1, and closes normally open contact PHCU–2 (27) setting up the circuit of the short time delay relay TC2.

As stated in step (8) above, with the third parcel at gate C, time delay relay T (32) is energized, and normally closed contact T–1 (35) is opened to lock out the primary diverter. Connected to open when contact T–1 (35) opens, is a contact W–1 (see also FIG. 15) which contact is in series with the circuit between the read-out head of the primary memory drum and the write-in head of the buffer register, so that no destination information relative to the fourth parcel can enter the buffer register, and the fourth parcel merely passes on to the recirculation conveyor without upsetting operation of the secondary diverter memory system.

*Releasing of parcels from buffer.—Section A*

(1) Assume that the first parcel is at gate A and that a release signal is given from the timer of the inhibit release circuit at the secondary conveyor (FIG. 16). The parcel at gate A will now be released. The release signal momentarily closes contact I–1 (5). The parcel at gate A will have broken the light beam of photo sensor PHAU. The relay of PHAU is energized, and normally open contact PHAU–1 (5) causes immediate energization of relay RA3 (5) and of solenoid SOL. A (6) of the air valve controlling gate A. On energization of solenoid SOL. A, the air valve actuates and reverses air pressure in the operating cylinder of gate A. As soon as gate A starts to open, normally open limit switch LSA (4) closes, thereby setting up circuit 4 of relay RA1 (4).

(2) As the first parcel passes through gate A, it breaks the light beam of photo sensor PHAL. The sensor relay is energized, and thereby closes contact PHAL–3 (FIGS. 14 and 16) which sends a shift pulse to the third stage of buffer register, to transfer the secondary diverter information for the first parcel to secondary storage. Energization of the PHAL relay by the first parcel passing through gate opens normally closed contact PHAL–2 (2) in the circuit of relay RA2 (2), and closes normally open contact PHAL–1 (4) in the circuit of relay RA1 (4). Since normally open limit switch LSA (4) is now closed because gate A is open, when normally open contact PHAL–1 (4) is closed by passage of the first parcel through gate A, relay RA1 energizes, closing its holding contact RA1–1 (3), and closing contact RA1–2 (2) for setting up the circuit for relay RA2 (2).

(3) When the first parcel clears gate A and the light beam of photo sensor PHAL is re-established, the sensor relay of PHAL de-energizes, re-opening normally open contact PHAL–1 (4) in the line of relay RA1 (4) and re-closing normally closed contact PHAL–2 (2) in the line of relay RA2 (2). Since relay RA1 (4) is held energized by its holding contact RA1–1 (3), normally open contact RA1–2 (2) remains closed, so that the reclosing of normally closed PHAL–2 (2) completes circuited (2) thereby energizing relay RA2 (2). When relay RA2 (2) is energized, it opens normally closed contact RA2–1 (6), which de-energizes relay RA3 (5). This re-opens the normally open holding contact RA3–1 (6) for relay RA3 (5).

Opening of normally closed contact RA2–1 (6) by the reestablishment of the beam of PHAL also de-energizes solenoid SOL. A (6) of the air valve controlling gate A. On de-energization of solenoid SOL. A, the air valve is actuated, and reverses the air pressure in the cylinder of gate A, thus causing gate A to close. When closed, gate A depresses and re-opens limit switch LSA (4), which opens circuit 4. This de-energizes relay RA1 (4) and opens its holding contact RA1–1 (3). Previously closed normally open contact RA1–2 (2) is also re-opened, de-energizing relay RA2 (2). Relay RA3 was previously de-energized as described above, gate A is now closed and relays RA1, RA2 and RA3 are now restored to their normal, de-energized condition.

*Section B*

(1) Returning to the condition when the release signal momentarily closed contact I–1 (5), assume now that the buffer is entirely empty, the action at Gate B will be described. With the buffer empty, gate B is in its normally open condition, and contact RB3–1 (17) in the circuit of time delay relays TB1 (18) and TB2 (16) is open. Relay RB3 (12) is de-energized when gate B is open and the buffer is empty, because the light beam of PHAU is uninterrupted, and no parcel is sensed by PHCL. Also, PHBL is de-energized, and normally open contact PHBL–1 (11) is open, so that relay RB1 (11) is de-energized. Relay RB2 (9) is also de-energized because normally open contact RB1–2 (9) is now open, and with relay RB2 (9) de-energized, normally open contact RB2–1 (12) in the circuit of relay RB3 (12) is also open. With relay RB3 (12) de-energized, contact RB3–1 (17) in the circuit of time delay relays TB1 (18) and TB2 (16) is open. Thus neither of the two delay relays TB1 (18) and TB2 (16) will energize.

Taking another condition relative to the action at gate B, assume now that section A is occupied when the release signal closes contact I–1 (5), but that section B is empty. The action at gate A has been described, as for the action at gate B, which has been closed by the parcel at gate A, even though gate B is closed there is no parcel there and the beam of upstream photo sensor PHBU is unbroken. Thus the sensor relay of PHBU is de-energized, and normally closed contact PHBU–1 (18) in the circuit of long time delay relay TB1 (18) remains closed.

Relay RB3 (12) remains energized through its holding contact RB3–2 (13) when gate B is closed, so that normally open contact RB3–1 (17) in the circuit of long time delay relay TB1 (18) is also closed. Thus time delay relay TB1 (18) (long delay 0.8 sec.) will be energized by receipt of a release signal closing contacts I–1 (5). Holding contact TB1–1 (INST. 19) closes. Timing action starts as soon as time delay relay TB1 (18) is energized, and normally closed timing contact TB1–2 (13) is opened by the timer after elapse of the long time delay (0.8 sec.). Because relay RB3 (12) and solenoid SOL. B (13) of the air valve controlling gate B de-energize as soon as timing contact TB1–2 (13) is reopened by the timer, gate B opens 0.8 sec. after receipt of the release signal. This gives gate A sufficient time to close again before another parcel reaches it.

Assume now still another condition relative to gate B. Assume that gate B is retaining a parcel, when the release signal is given. This means a parcel is at gate A, but the action at gate A has been described. Returning to the action at gate B, the light beam of photo sensor PHBU is interrupted by the parcel retained at gate B, its sensor relay is energized, and normally closed contact PHBU–1 (18) in the circuit of the long time delay relay TB1 (18) is now open. However, with the beam of PHBU interrupted, and with the relay of PHBU energized, normally open contact PBHU–2 (16) in the circuit of the short time delay relay TB2 (16) is closed. Thus, on receipt of the release signal closing contact I–1 (5) momentarily, the short time delay relay TB2 (16) (approximately 0.2 sec.) energizes, starting timing action for contact TB2–2 (13) in the circuit of solenoid SOL. B (13). The aforementioned energization of the short time delay relay TB2 (16) also closes the holding contact TB2–1 (inst. 15), and holds the short time delay relay TB2 (16) energized, upon cessation of the momentary release signal.

(2) Upon expiration of the short time delay (approximately 0.2 sec.) normally closed timer contact TB2–2 (13) is opened by the time delay relay TB2 (16) so that both relay RB3 (12) and solenoid SOL. B (13) are de-energized. Upon de-energization of solenoid SOL. B, the air valve actuates and reverses air pressure in cylinder of gate B, causing gate B to assume its normally open condition, and release its parcel. As soon as gate B starts to open, normally closed limit switch LSB (11) is permitted to close, thereby setting up contact 11 of relay RB1 (11), ready to close gate B as required.

When relay RB3 (12) is de-energized as mentioned above, normally open contact RB3–4 (22) in the line of relay RC1 (22) is re-opened. Also, the normally open holding contact RB3-2 (13) for relay RB3 (12) is re-opened. Finally, normally open contact RB3-1 (17) is also re-opened, de-energizing the short time delay relay TB2 (16). Upon de-energization of TB2 (16), normally closed timer contact TB2-2 (13) in the line of solenoid SOL. B (13) recloses, but with relay RB3 (12) de-energized SOL. B (13) remains de-energized, and gate B stays open. Normally open holding contact TB2-1 (inst., 15) for the short time delay relay TB2 (16) also opens on de-energization of TB2.

(3) As the released parcel passes through open gate B, it breaks the light beam of downstream photo sensor PHBL, the sensor relay energizes, and opens normally closed contact PHBL-2 (9) in the circuit of relay RB2 (9). Interruption of PHBL by the parcel leaving gate B also closes normally open contact PHBL-1 (11) in the line of relay RB1 (11). Since limit switch LSB (11) has been permitted to close because gate B is now open, the aforesaid energization of the sensor relay PHBL by the parcel passing through gate B energizes relay RB1 (11) through contact PHBL-1 (11) and limit switch LSB (11). Relay RB1 (11) now closes its holding contact RB1-1 (10) and also closes contact RB1-2 (9), setting up the circuit of relay RB2 (9).

Interruption of PHBL by the parcel passing through gate B also closes contact PHBL-3 (FIGS. 14 and 16) sending a shift pulse to the second stage of the buffer register, which transfers the secondary diverter information for the parcel at gate B to the third stage of the buffer register.

(4) When the parcel clears gate B and and the light beam of photo sensor PHBL is restored, the sensor relay de-energizes, reopening previously closed normally open contact PHBL-1 (11) in the line of relay RB1 (11), and reclosing previously opened normally closed contact PHBL-2 (9) in the line of relay RB2 (9). Since relay RB1 (11) is held energized by its holding contact RB1-1 (10), with which contact RB1-2 (9) in the line of relay RB2 (9) is also closed, the aforesaid reclosing of contact PHBL-2 (9) energizes relay RB2 (9). Relay RB2 (9) now closes contact RB2-1 (12) in the circuit of relay RB3 (12). As previously mentioned, the short time delay after the release signal has elapsed, permitting the reclosing of normally closed timer contact TB2-2 (13). With the energization of relay RB2 (9) as described above, normally open contact RB2-1 (12) is also closed, which re-energizes relay RB3 (12) and solenoid SOL. B (13) of the air valve controlling gate B.

On energization of SOL. B, the air valve actuates and reverses air pressure in cylinder of gate B, thus causing gate B to close, after passage of the parcel. When closed, gate B depresses and opens limit switch LSB (11) which then opens circuit 11 and thereby de-energizes relay RBI (11) to cause the opening of the holding contact RB1-1 (10) for relay RB1 (11). Thus, previously closed normally open contacts RB1-3 (21) in the line of relay RC1 (22), and previously closed normally open contact RB1-2 (9) in the line of relay RB2 (9) reopens. This de-energizes relay RB2 (9). As mentioned, gate B has now closed to cover the parcel that just left section B and is now in section A. Gate B is now closed and ready for another parcel from section C.

*Section C*

(1) Referring now to the action at gate C, assume again that a release momentarily closes contact I-1 (5), and that the buffer is either entirely empty, or that only section A is occupied. Under these conditions, gate C will remain in its normally open condition, as previously described. To recapitulate, relay RC3 (23) is de-energized when gate C is open, due to de-energization of relays RC1 (22) and RC2 (20). Thus with normally open contacts RC2-1 (23) and RC3-3 (24) open, sole- noid SOL. C (24) is de-energized, and gate C is always open when SOL. C is de-energized.

If sections A and B are occupied, but section C is empty, gate C will be closed, as described in the discussion of the filling action. Although gate C is closed, there is no parcel there and the beam of PHCU is uninterrupted. Thus the PHCU relay is de-energized and normally closed contact PHCU-1 (29) in the circuit of the long delay timer relay TC1 (29) remains closed, whereas normally open contact PHCU-2 (27) in the line of short delay timer relay TC2 (27) is open. This locks out the short delay timer relay TC2 (27). Relay RC3 (23) was energized when the parcel now at gate B cleared PHCU and PHCL, and relay RC3 (23) is held energized by its holding contact RC3-3 (24). Contact RC3-2 (28) in the circuit of long time delay relay TC1 (29) is therefore closed. Thus with no parcel at gate C, and with PHCU de-energized, normally closed contact PHCU-1 (29) is also closed which sets up the long delay timer TC1 (29).

The long delay timer TC1 (29) (long delay, approximately 1 sec.) will be energized and its holding contact TC-1 (30) closes, upon receipt of a release signal that closes contact I-1 (5). Timing action starts upon energization of TC1 (29), and normally closed timer contact TC1-2 (24) is opened after elapse of the long time delay (approximately 1 sec.). The delayed opening of timer contact TC1-2 (24) de-energizes solenoid SOL. C (24), so that gate C opens approximately 1 sec. after receipt of the release signal. This provides ample time for the transfer of the parcel from gate B to gate A, with the subsequent closing of gate B. If gate C had opened immediately, a new parcel could have been diverted, passing directly through open gate C, to reach gate B before it had time to close.

Assume now that gate C is retaining a parcel, on receipt of the release signal. The light beam of photo sensor PHCU is interrupted, its sensor relay is energized, and normally closed contact PHCU-1 (29) in the circuit of long delay timer TC1 (29) is now open. However, normally open contact PHCU-2 (27) in the circuit of short delay timer TC2 (27) is closed. As previously explained, relay RC3 (23) will have been energized, and contact RC3-2 (28) in the circuit of short delay timer relay TC2 (27) will have been closed as before. Thus, on receipt of a release signal momentarily closing contact I-1 (5), time delay realy TS2 (27) (short delay, approximately 0.4 sec.) is energized, starting timing action.

(2) Upon expiration of the short time delay (approx. 0.4 sec.), timer contact TC2-2 (24) is opened, by the short time delay relay TC2 (27), de-energizing relay RC3 (23) and solenoid SOL. C (24). As solenoid SOL. C is de-energized, its air valve is actuated and reverses the air pressure in the cylinder of gate C, causing gate C to resume its normally open position. As soon as gate C starts to open, limit switch LSC (22) is permitted to close, thereby setting up circuit 22 of relay RC1 (22), ready for reclosing gate C as required.

When gate C releases its parcel, PHCL is interrupted closing contact PHCL-3 (FIGS. 14 and 16). This sends a shift pulse to the first stage of the buffer register, to transfer the secondary diverter information for the parcel released by gate C to the second register stage.

As mentioned, opening the short time delay timer contact TC2-2 (24) in order to open gate C and release its parcel, also de-energizes relay RC3 (23). Thus, normally open contact RC3-1 (32) reopens, thereby de-energizing diverter timer delay relay T (32). Time delay T (32) then starts timing action (time delay begins on de-energization) after elapse of the delay period relay T (32) recloses previously opened normally closed contact T-1 (35) in the circuit of control relay RD for the primary diverter. The time delay of T (32) is set for approximately 1 sec. and closes contact T-1 (35)

after elapse of this time to prevent a parcel diversion after gate C starts to open to release its parcel. The time delay relay T (32) holds the diverter relay RD (35) de-energized for a time, long enough (1 sec.) to insure that gate C will not only release its parcel to gate B but will have time to close if the parcel is retained at gate B, before a new parcel is diverted to gate C.

De-energization of relay RC3 (22), as described above, also reopens normally open holding contact RC3–3 (24) in the line of solenoid SOL. C, so that gate C stays open to pass the parcel. De-energization of relay RC3 (22) also reopens normally open contact RC3–2 (28), de-energizing time delay relay TC2 (27). Normally closed timer contact TC2–2 (24) recloses, and normally open holding contact TC2–1 (inst. 26) for relay TC2 (27) reopens on de-energization of TC2 (27).

(3) When the parcel passes through open gate C as described, and breaks the light beam of photo sensor PHCL, the sensor relay energizes, and opens normally closed contact PHCL–2 (20) in the line of relay RC2 (20). It closes normally open contact PHCL–1 (22) in the line of relay RC1 (22). Since normally closed limit switch LSC (22) has been permitted to close because gate C is open, and since either contact RB3–4 (22) or RB1–3 (21) in the circuit of relay RC1 (22) is closed, depending on the position of the parcel leaving gate B, relay RC1 (22) energizes, closing its holding contact RC1–1 (21), and closing normally open contact RC1–2 (20), to set up relay RC2 (20).

(4) when the parcel clears gate C and the light beam of photo sensor PHCL is restored, the sensor relay of PHCL is again de-energized, reopening previously closed normally open contact PHCL–1 (22) in the line of relay RC1 (22). However, the latter relay is held energized by its holding contact RC1–1 (21), and with relay RC1 (22) energized, normally open contact RC1–2 (20) in the line or relay RC2 (20) is closed. The aforesaid restoration of the beam of PHCL by the parcel clearing gate C also recloses normally closed contact PHCL–2 (20) which completes circuit 20, thereby energizing relay RC2. Relay RC2 now closes normally open contact RC2–1 (23) in the circuit of relay RC3 (23), and the previous reclosing of normally closed contact TC2–2 (24), as described in step (2) above, cause the above mentioned closing of contact RC2–1 (23) to energize relay RC3 (23) and solenoid SOL. C (24) of the air valve controlling gate C.

On energization of solenoid SOL. C, the air valve actuates and reverses air pressure in cylinder of gate C, thus causing gate C to close, blocking off the parcel at gate B, which gate now restrains the parcel that just left gate C. When in its closed position, gate C depresses and opens normally closed limit switch LSC (22), which opens circuit 22 and thereby de-energizes relay RC1. With de-energization of this relay, previously closed normally open holding contact RC1–1 (21) opens, as does previously closed normally open contact RC1–2 (20). Opening of the latter contact de-energizes relay RC2 (20). Relay RC3 (23) is held energized by its holding contact RC3–3 (24), and since normally closed timer contacts TC1–2 (24) and TC2–2 (24) are also closed, holding contact RC3–3 (24) keeps solenoid SOL. C (24) energized, which keeps gate C closed. As mentioned, gate C has closed to cover up the parcel in section B and is now ready for a new parcel from the associated primary diverter.

*The inhibit release circuit*

In the post office system being described by way of example, it has been assumed that the primary conveyors operate nominally at 240 ft. per minute and the secondary conveyors operate nominally at 300 ft. per minute. This means that a parcel on a secondary conveyor will move about 5 ft. in one second. By way of further example, it is assumed that the maximum length parcel to be handled in the system is 34 inches, and that the buffer conveyors are on 7½ foot centers.

The buffer conveyor belt runs at 360 ft. per minute. At this speed of operation, the elapsed time from the release of a parcel by gate A to the positioning of the parcel on the secondary conveyor is one second, which corresponds to the aforesaid 5 ft. motion of the secondary conveyor.

One of the criteria of the invention is the establishment of parcel location on each secondary conveyor belt, such that the minimum distance between the trailing edge of one parcel, and the leading edge of the following parcel is sufficiently large to permit unimpeded operation of the secondary diverters. Stated differently, each secondary diverter must, upon receipt of a diversion signal, operate at a speed that enables it to sweep a moving parcel clear of the secondary conveyor, and retract from the conveyor without being struck by the following parcel. The secondary diverters employed will readily meet this requirement with the aforesaid 5 ft. trailing edge spacing of the parcels.

Another criterion of the invention is that the parcel placement circuit, here termed the inhibit-release or release circuit, should not waste belt space, the parcels being spaced as close together as possible on the secondary conveyors, while meeting the above-mentioned minimum space requirements.

A third criterion, which is a corollary of the above, is that the parcel release circuit for the buffer conveyors should perform an inhibit function that precludes the release of a parcel from a given buffer at a time when a previously released parcel is in front of, or too close to, the buffer. These requirements are met by a simple circuit which, in effect, maintains the aforesaid nominal minimum spacing between the trailing edges of adjacent parcels and precludes interference at the secondary diverters.

A release system that meets these requirements is illustrated schematically in FIG. 16. In this figure, the operation of the buffer conveyor at the junction of the last primary conveyor P9 and the first secondary conveyor S1 will be described. The buffer conveyor involved has been designated as buffer conveyor BC–P9S1, and the primary diverter associated herewith has the same secondary designation. This coding system applies to the other buffers and conveyors in the figure.

To facilitate explanation of the principles of the inhibit release circuit, the following conditions will be assumed. For example, a parcel X has been indicated in full lines on the secondary conveyor S1 which is moving in the direction of the arrow on the conveyor. The trailing edge of this parcel is 5 feet upstream from the upstream side of the ninth buffer conveyor BC–P9S1. A parcel X3 is assumed to be at gate A of buffer conveyor BC–P9S1, awaiting a release signal. It will be assumed that the upstream side of the latter buffer conveyor forms a reference line $u$, with which the trailing edge of the parcel X3 to be released from this buffer will ideally coincide. As mentioned, in actual operation, approximately one second will elapse between the release of a parcel X3 by gate A of buffer conveyor BC–P9S1, and its positioning on the secondary conveyor, and during this time, the parcel X on the secondary conveyor will travel 5 feet, indicated as the distance "$s$" in the drawing. Interference at the secondary diverters is prevented and the parcels are properly spaced by a minimum distance $s1$ (which varies with parcel length) by a circuit under the control of a photo sensor PET9. The photo sensor is mounted upstream from the reference line $u$ by a distance of $2s$, or 10 feet in the present example.

The principle of operation of the inhibit release circuit is as follows: When the parcel X (illustrated in full lines in FIG. 16) was at a position X1 illustrates in phantom in the drawing, the trailing edge of parcel X was upstream from the reference line $u$ by the distance $2s$ (10 feet, or 2 seconds). At this time, the trailing edge of the parcel X will have just permitted re-establishment of the beam of photo sensor unit PET9.

Photo sensor PET9 is connected so that when its beam is unbroken, the relay of the unit is de-energized, thereby permitting normally closed relay contacts PET9-1 to close. Contacts PET9-1 are in series with contacts PHAL-4 of photo sensor PHAL mounted at the upstream buffer conveyor BC-P8S1. The purpose of this connection will be explained presently. It will be assumed for the moment, that parcel X4 has not been released from BC-P8S1 and that contacts PHAL-4 are still closed, in which case closing of contacts PET9-1 energizes a relay IR (the inhibit release relay) which is therefore normally energized. This relay has two sets of contacts, normally closed contacts IR-2 and normally open contacts IR-1. When closed, contacts IR-1 connect an input voltage or the like, to an Inhibit Timer which is thereby continuously reset, and contacts IR-2 (when closed) initiate a count-down period in the Inhibit Timer.

However, when relay IR is de-energized, as a result of a parcel on the secondary conveyor blocking the light to PET9, the continuous reset contacts IR-1 are closed and the start timing contacts IR-2 are opened so that the Inhibit Timer is reset. Once the light to PET9 is re-established, the relay IR is again energized and the Inhibit Timer now starts timing, but it is of such a design that it produces no output at the start of the timing cycle. The details of this timer form no part of the invention, and timers that are continuously reset upon receipt of one signal, and that start timing upon receipt of another signal are well known in the art.

At the end of its 2 second count-down period, the Inhibit Timer energizes the release relay I, previously referred to in connection with the buffer control circuit. Relay I now closes the release contacts I-1, and establishes the release circuit through relay contacts PHAU-1 (previously described) which are closed when a parcel such as parcel X3 is present at gate A of buffer BC-P9S1. A release signal is now given to solenoid SOL. A, to open gate A of buffer conveyor BC-P9S1. When the release signal is given for parcel X3, the parcel X on the secondary conveyor will be at the position shown at X2.

The action will now be recapitulated, again on the assumption that X4 is not present and that PHAL is de-energized. When a parcel, such as parcel X shown in FIGURE 16 was just upstream of the sentry position X1 shown in phantom, the parcel interrupted the beam of sentry photo sensor PET9 and the relay of the photo sensor PET9 was energized and thereby opened contacts PET9-1. The interruption of the beam of PET9 by the parcel X, and the attendant opening of normally closed contacts PET9-1, de-energized the inhibit release relay IR and, through the closing of contacts IR-1, reset the Inhibit Timer. The release relay I was therefore de-energized, and the release contact I-1 opened. Thus no release signal was passed onto solenoid SOL. A of the buffer conveyor BC-P9S1.

However, as soon as the trailing edge of parcel X clears the beam of photo sensor PET9, it is time to establish minimum parcel spacing. The relay of the photo sensor PET9 is de-energized as its light beam is restored, permitting the normally closed contacts PET9-1 to reclose. Assuming, as before, that buffer conveyor BC-P8S1 is empty, the Inhibit Release relay IR will be again energized through contacts PET9-1. This opens the continuous reset contacts IR-1 and closes the start timing contacts IR-2, and the 2 second count-down of the Inhibit Timer begins. The release relay I remains de-energized. When the trailing edge of the parcel X passes to the position indicated in full lines in FIG. 16, parcel X will have travelled the minimum trailing edge to trailing edge distance s, and approximately one second of time will have elapsed since the Inhibit Timer started its count-down. After the elapse of the 2 second time period of the Inhibit Timer, parcel X will be in the position illustrated in phantom at X2 in the secondary conveyor, so that its trailing edge will be at reference line u. The Inhibit Timer now times out, and the release signal is now given by energization of relay I, as previously described. Since a parcel X3 is behind gate A of the buffer conveyor BC-P9S1, contacts PHAU-1 in the buffer control circuit are also closed, and parcel X3 will be released.

The parcel X, which was at the position X2 opposite buffer conveyor BC-P9S1 at the time of release of parcel X3 from that buffer conveyor, will have reached the position X5 (shown in phantom) downstream of photo sensor PES9 when the parcel X3 finds its position on the secondary conveyor at position X2. During the next second, parcel X3 travels the distance s and first breaks and then restores the beam of photo sensor PES9. The reclosing of contacts PES9-1 upon restoration of the beam of PES9, transfers the secondary diverter code for parcel X3 from the secondary storage to the secondary memory drum (see FIGS. 14 and 15).

*Interlock circuit*

An interlock circuit is provided so that a parcel X4 released from the buffer BC-P8S1, which parcel will not be sensed by the inhibit release photo sensor PET9, inhibits the release of a parcel X3 from the buffer BC-P9S1. It is for this reason that contacts PHAL-4 are provided in the photo sensor PHAL for gate A of the upstream, or eighth buffer conveyor BC-P8S1. If a parcel X4 is released from buffer BC-P8S1, and hence breaks the beam of the associated photo sensor PHAL (as shown) before the parcel X3 at gate A of the ninth buffer has been released, the parcel X3 should not be released from the buffer BC-P9S1. Parcel X3 should not be released under these conditions, because there would not be the minimum trailing edge spacing s between parcels X3 and X4. Thus upon release of parcel X4 from the eighth buffer, the normally de-energized relay of photo sensor PHAL for buffer conveyor BC-P8S1 is energized, opening contacts PHAL-4 (as shown), and interrupting the circuit to the Inhibit Timer. When the beam of PHAL at the eighth buffer is re-established, the 2 second count-down starts, and insures that parcel X3 will not be too close to parcel X4. This has the same effect as if a parcel X had broken the beam of photo sensor PET9. In either case, relay IR is de-energized, and normally closed contacts IR-1 are closed (as shown) to reset the Inhibit Timer, and then reopened to start the 2 second time cycle. A photo sensor PET8 and associated circuitry are provided upstream of buffer conveyor BC-P7S1 to serve the same purpose for buffer conveyor BC-P8S1 as is served by PET9 for buffer BC-P9S1, and so on up the line.

*Sensing timer circuit*

Means are provided to insure that the parcel X3, when released from buffer conveyor BC-P9S1, and only that parcel, will operate the transfer photo sensor PES9 associated with that buffer conveyor. As mentioned PES9 is provided in order to transfer destination information for parcel X3 from secondary storage (which is in effect the last stage of the buffer register) to the secondary memory drum MD-S1. This is accomplished by the provision of a one second Delay Timer and a one second Sensing Timer and its associated relay U in the circuit of the PES9 transfer photo sensor relay.

When parcel X3 is released from the ninth buffer, parcel X will be at position X2, and so will not have cleared the beam of transfer photo sensor PES9. Photo sensor relay PHAL for the ninth buffer is energized as the parcel X3 passes under gate A, which starts timing action of the one second Delay Timer. One second after release of parcel X3 (distance s on the secondary conveyor) the parcel X will have reached the position X5 on the secondary conveyor, and so will have cleared the beam of transfer photo sensor PES9 for the ninth buffer. Hence the recently released parcel X3, which will now be at position X2, must be the next parcel to break the beam of PES9 for the ninth buffer. After elapse of the first second, that is, after parcel X3 at the ninth buffer has reached position X2 on the secondary conveyor, the Delay Timer energizes a Sensing Timer, which set to close relay U for a time of one second, corresponding to the distance $s$ between trailing edges of the parcels. The sensing relay U has normally open contacts U–1 in series with the power line of the relay of photo sensor PES9.

The Sensing Timer, after energization by the Delay Timer, when parcel X3 reaches position X2 on the secondary conveyor, holds contacts U–1 of relay U closed for one second, which time represents the travel of the recently released parcel X3 from position X2 on the secondary conveyor to position X5 downstream PES9. During this travel time of parcel X3, the relay of PES9 is now connected to the line through contacts U–1 of relay U, so that when parcel X3 breaks and then restores the beam of PES9, its destination information is transferred to the secondary memory drum MD–S1. After the expiration of the last one second timing period, the Sensing Timer de-energizes relay U, normally open contacts U–1 reopen, locking out the photo sensor unit PES9. Under this condition, no upstream parcels on conveyor S1 can operate the relay of PES9, so that PES9 can transfer information to the secondary memory drum only in response to the release of a parcel, such as parcel X3, from buffer conveyor BC–P9S1. A similar interlock arrangement and similar transfer photocells (PES0 to PES8) are provided for the transfer of coded information onto MD–S1 at the appropriate times.

Control system—General

The control system is, in principle, a direct electrical analogue of the physical arrangement of the parcel sorting conveyors, there being a dynamic memory for each primary and each secondary conveyor which has diverters, and a three stage static memory (register) for each buffer conveyor. FIGURE 15 provides a broad diagrammatic picture of the control system for primary conveyor P9, buffer BC–P9S1 and secondary conveyor S1. However, since there is only one memory drum (MD–S1) for secondary conveyor S1, the output of the buffer registers (BR–P0S1 to BR–P8S1) corresponding to buffers BC–P0S1 to BC–P8S1 will each feed that drum, and, since conveyors S2 to S6 may also receive parcels from conveyor P9 via these buffers, the memory drum MD–P9 corresponding to conveyor P9 will provide appropriate outputs for each of the corresponding registers. (See also FIGS. 18A, 18B and 18C.)

More specifically, the information concerning each parcel destination is transferred from the keyboard 68–P9 at primary conveyor P9 to a patch panel PP–P9 which connects the keyed input line to output lines corresponding to the correct primary and secondary diverter to be operated (for example, primary diverter PD–P9S1 and secondary diverter SD–41/42). Each line from the patch-panel PP–P9 is then connected, by a binary encoder BE–P9, to a plurality of output lines in accordance with a predetermined binary code, the coded output being received and temporarily stored by a primary storage PS–P9.

As soon as the corresponding parcel has been located on the primary conveyor P9 by the photo-sensor PEP9 the coded information is called out of the primary storage PS–P9 and written on the primary memory drum MD–P9 so that its position thereon exactly corresponds with position of the parcel on conveyor P9. As the parcel proceeds along conveyor P9 past the successive primary diverters and finally arrives opposite diverter PD–P9S1 the information on the primary memory drum in MD–P9 also passes beneath corresponding successive read heads until it is positioned beneath a set of read heads corresponding to primary diverter PD–P9S1. The read heads pass the coded primary diverter information to decoding gate DG–P9S1 which recognizes the code and effects the operation of diverter PD–P9S1, unless the operating signal is blocked by switch contact T–1 (FIGS. 15 and 17B) in the buffer control circuit BCC–P9S1. The switch contacts T–1 are opened when the buffer BC–P9S1 is full. If the buffer BC–P9S1 is not full, the buffer control circuit BCC–P9S1 will close switch contacts W–1 to allow the coded secondary diverter information to pass to the first stage of the buffer register BR–P9S1 where it is received just as the primary diverter PD–P9S1 starts to deflect the parcel from conveyor P9.

If buffer BC–P9S1 is empty, the incoming parcel will break the light beam to photo-sensor PHCL and effect the shifting of the coded information into the second stage of buffer register BCC–P9S1. Similarly, the breaking of the light beam to photo-sensor PHBL effects the shifting of the information from the second to the third stage of the buffer register and, when the buffer gate A is opened as previously described, a signal from photo-sensor PHAL shifts the information from the third stage of the buffer into the last stage, or secondary storage, SS–P9S1. The Delay and Sensing Timers DT–P9S1 and ST–P9S1 are also activated by the PHAL. Immediately the parcel has been located on the secondary conveyor S1 by photo-sensor PES9, the information is called out of secondary storage SS–P9S1 onto secondary memory drum MD–S1 so that the information is located on the surface of this drum at a position which exactly corresponds with the position of the parcel on the secondary conveyor S1. Again, the recorded information is conveyed past successive read heads positioned to correspond with successive secondary diverters on conveyor S1 until the information is at last presented to decoding gate DG–S141 which recognizes the code and effects the operation of secondary diverter SD–41/42 in the correct direction.

Control system elements

FIGURES 18A, 18B and 18C form connecting parts of a diagram which illustrates in greater detail the manner in which all the various control system elements may be interconnected.

Keyboard

The keys on the keyboard 68–P9 are preferably arranged in a form which will permit the use of an extractive code which can be derived from the addressed parcels so that a large number of destinations can be handled. There are, commercially available, such keyboards which incorporate electronic directories that translate the keyed code into binary code words that indicate which diverters are to be operated. If such a keyboard were to be used, it would replace in fact and in function the illustrated keyboard, patch panel and binary encoder. However, keyboards of this type are expensive and may not be justified for this application and a simpler, but analogous, system is used in this application by way of illustration only.

Essentially, therefore, the keyboard should provide a means whereby the operator can, by means of a code designed to suit him, record the destination of each parcel. Preferably an extractive keying code is used but the keyboard is arranged to give a limited number of outputs. In the illustrated example, the keyboard simply connects a positive supply to any one of a large number of output lines. If it is assumed that the maximum number of final destination classes which can be sorted on or by the system of this invention (including both manual and mechanical sockout stations) is about 2500, then a 50×50 cross bar or selector type of keyboard is suitable, provided that the keys are properly arranged. Therefore, in order to register a given parcel, the operator extracts the code from the parcel address and sets the keys accordingly (for example, turns knobs such as 200 and 201 as shown in FIGURE 18A) and then presses a completion bar 202 before coding the next parcel. The depression of completion bar 202 causes contacts 203 to be closed and connect a positive supply source (not shown) to the selector switches 204 which, in turn, select the appropriate output line.

A warning light 206 is mounted in the keyboard paneling and performs the dual function of indicating to the operator that the information has been registered in the primary storage PS–P9S1 and warning the operator against pressing the completion bar 204 again while the light is still on. The warning light 206 may be a high impedance indicator light connected as part of the load of one side of a bistable multivibrator or switching circuit 209. The circuit 209 is connected so that the warning light 206 is normally off, but so that, as soon as the completion bar 204 is depressed, the positive pulse in line 210 switches circuit 209 so that the warning light 206 is turned on, the light only being turned off again when a positive pulse is received from the call-out signal line 212 to indicate that the corresponding parcel has been located by the photo sensor PEP9.

Patch panel

The 2,500 (say) lines from the keyboard 68–P9 pass directly to the patch panel PP–P9 and each line terminates in a separate socket 214 mounted in the insulating input board 216. Primary and secondary output socket boards 218 and 220 (respectively), also having sockets (219 and 221 respectively), are mounted on the output side of the patch panel PP–P9, primary board 218 having 23 sockets 219 and secondary board 220 having 52 sockets 221 (the socket numbers respectively corresponding to the number of primary diverters on conveyor P9 and secondary diverters on conveyor S1). Thus, by means of the diode plug leads 224, any of the 2,500 sockets 214 on board 216 may be connected to any socket on board 218 and/or 220.

Binary encoder

The binary encoder BE–P9 is of the familiar diode matrix type and is divided into two halves; a primary half 226 into which the 23 lines connected to patch panel sockets 219 pass, and a secondary half 228 into which the 52 lines from patch panel sockets 221 pass. Each incoming line is connected to predetermined code lines 230a and 230b by means of separate diodes 232 for each code line. Since 6 binary digits are required for the binary coding of the 52 secondary diverters, there will be six code lines 230b and six outputs from in the secondary half 228, each code line 230b extending between an output terminal 231b and a high impedance indicator light 232 connected to earth. However, only 5 binary digits are required to code the 23 primary diverters and therefore only 5 code lines 230a and terminals 231a are provided in the primary half 226 of the binary encoder BE–P9, five indicator lights 232 also being connected in these lines. It will be apparent that when any incoming line is connected to a positive source of direct current a positive voltage pulse will be impressed on each code line connected to the incoming line and the corresponding indicator lights will be illuminated. If each terminal having a positive voltage is regarded as providing a "1" signal and each terminal having ground voltage is regarded as having "0" signal, then the output of each section of the binary encoder Be–P9 corresponds to the binary code of the decimal number of the input line (and, thus, the diverter) which has been energized through the keyboard 68–P9 and patch panel PP–P9.

Note that the connections for incoming primary lines 16, 17, 18 and 19, corresponding to primary diverters PD–P9S$p$, PD–P9S$q$, PD–P9S1 and PD–P9S2 respectively, and incoming secondary lines 39 to 42 inclusive, are shown in FIGURE 18A.

Memories

Although the static and dynamic memories employed in this control system are in common use and are commercially available, they will now be described in detail for the sake of clarity and completeness.

Static memories

The static memories in the control system are the primary and secondary storages and the buffer registers and each may be built from the conventional bistable multivibrator or flip-flop shown in FIGURE 19. Complete analysis and discussion of such circuits may be found in the Department of the Army Publication #TM11–690 (Basic Theory and Application of Transistors, 1959) and in "Computor Logic" by Ivan Flores, published by Prentice and Hall, Inc., 1960.

FIGURE 19 illustrates a two-stage single digit multivibrator flip-flop memory suitable for use as part of the buffer register BR–P9S1 or BR–P9S2, the storages PS–P9, SS–P9S1 and SS–P9S2 being shown as single stage storage devices. Since each stage is substantially identical, the operation of the first will only be considered in comparative detail. When the collector and bias power supplies VCC and VBB respectively are connected to the circuit, transistor Q11 is cut off and transistor Q12 is saturated, the condition being initiated by the unequal bias on the bases of Q11 and Q12 due to an appropriate adjustment of the bias resistors RB11 and RB12. Once the switching action has been initiated, the positive feedback through the collector and base circuits of each transistor insures that the change is quickly completed. If a positive mark or writing pulse is passed through coupling capacitor CC12 to the base Q12, the reverse change or switching action will be initiated and Q12 will be cut off and Q11 will saturate; similarly, the passage of a positive pulse from the shift terminal ST1 through coupling capacitor CC11 to the base of Q11 will cause the circuit to revert to its initial or "off" state.

Each time the circuit is switched back by the shift pulse to its initial state an output positive pulse is generated by the output circuit comprising resistor RO1 and capacitor CO1 and appears at the output terminal OT1. However, provided that the mark and shift pulses are not applied at a frequency greater than the circuit frequency response, an output pulse will not be generated when the circuit is switched from its normal or "off" state to its "on" state and, further, an output pulse will not be generated by a shift pulse unless the circuit is in the "on" state and reverts to the "off" state. Therefore, the mark pulse is, in effect, stored in the first stage of the multivibrator until it is read out by the shift pulse into the second stage. In the second stage, transistor Q21 is normally cut off and transistor Q22 is normally saturated so that the incoming mark pulse switches the circuit "on" and is stored in the second stage until the second stage shift pulse at the terminal ST2 again causes the circuit to revert to its normal "off" condition and generates the output pulse at a terminal OT2.

As indicated, the primary and secondary storages, specifically PS–P9, SS–P9S1 and SS–P9S2, are single stage, having one multivibrator circuit per digit to be stored. Each primary storage multivibrator circuit receives its mark pulses from the corresponding input lines from the binary encoder BE–P9 and receives its shift pulses along line 236 from the AND circuit 237 and the line 212. When any circuit is in its "on" state and a shift pulse is received, an output pulse is generated. The secondary storage units are 6 in number and receive input pulses from the last stage of the corresponding buffer memory; in fact as previously indicated, they may be regarded as constituting the fourth stage of the corresponding buffer register. The shift pulses are derived from the corresponding parcel locating circuit and the output pulses pass to the corresponding secondary conveyor memory drums.

Each buffer register (BR–P9S1 and BR–P9S2) has three six digit stages, shift pulses for each stage are derived through the corresponding buffer control unit from the corresponding photo sensors PHCL, PHBL and PHAL. The transferance of information from one stage to the next and the clearing of each stage is therefore made in synchronism with the parcel movement from stage to stage in the actual buffer.

*Dynamic memories*

Each dynamic memory, that is, each primary and secondary memory drum, may be a Dynastat (Registered Trademark) digital magnetic memory drum manufactured by Consolidated Controls Corporation and in which the read heads respond solely to the polarity of the recorded magnetic field and yield an output voltage and power which are directly applicable for logic action, the drums being geared to the process. It will therefore be assumed that the actual read and write head circuits and power supplies are provided by the manufacturer, as is customary. Thus, the output of the primary and secondary storages is suitable for directly driving the write heads, and the logic circuits included in the various decoding gates can be driven directly from the read heads. It is important, however, to select a memory drum of the correct capacity for each application and, it is because of the limited capacity of this type of drum, that both the primary and secondary diverter information has been coded.

In order to outline the way in which a Dynastat drum may be selected for use as the primary memory drum (MDP9), it should be assumed that the effective length of primary conveyor P9 is about 400 feet and that the operation of the primary diverters must be initiated with an accuracy equivalent to three inches of belt travel. Thus, each drum track must have a capacity of at least 1600 bits and the drum should rotate once for every four hundred feet of conveyor travel: it is here assumed that such a drum is so used. In FIGURE 18A the surface of drum MD–P9 has been developed and the location of the various heads is shown diagrammatically; erase or "set to zero" heads being shown cross-hatched, write heads being shown as empty rectangles, and read heads being identified by a dot.

One track is provided for each a code digit together with a permanently recorded clock track 240 over which the clock read head 242 is mounted. As the drum MD–P9 rotates, its surface moves in the direction of the arrow and all information tracks pass beneath the first erase heads EH–MDP9 which magnetizes all spaces of all the information tracks in the "zero" direction. The information from the primary storage PS–P9 is passed directly to a set of write heads WH–P9, one digit per head, and those write heads which are energized by the "1" digits reverse the polarity of the spaces directly beneath them so that the information is transferred to, and recorded upon, the surface of the memory drum MD–P9. As the drum further rotates, the recorded information is presented in succession to each set of read heads RH–P9S*a*, RH–P9S*q* and RH–P9S1 to RH–P9S6, the sets of read heads being spaced around the periphery of the drum by distances which accurately correspond with the spacing of the primary diverters, one from the other and each from the photo sensor PEP9. Thus, information is presented to each set of read heads RH–P9 just as the trailing edge of the corresponding parcel arrives opposite the upstream edge of the corresponding primary diverter. The groups of erase heads EH–P9S*a* to EH–P9S*q* and EH–P9S1 to EH–P9S6 are connected to erase information from the drum surface whenever that information is of no further use.

The secondary memory drums MD–S1 to MD–S6 may be of the same capacity (bits per track) as the primary drums MD–P0 to MD–P9, but need only have six information tracks and one clock track 241 with its head 243. However, although each drum is headed by a set of erase heads (EH–MDS1 to EH–MDS6), the write heads (WH–BP0S1 to WH–BP9S6) are spaced around the drum in groups corresponding with the spacing of the buffers along the respective secondary conveyors. As with the primary drums, the read and erase heads are spaced to correspond with the associated diverter spacing on the respective secondary conveyor.

It should be noted, in parentheses, that commonly available Dynastat drums have a track capacity of only 200 bits, and, if driven at the suggested speed, would not provide the requisite accuracy. Therefore, if such drums are to be used, the tracks can be "folded"; that is, the information can be recorded on successive parallel groups of tracks and the drum rotated "$n$" times the normal speed suggested above, where "$n$" is equal to the number of parallel track groups. For example, in the present case the primary drum track groups comprise a minimum number of 11 tracks, preferably 12, and 8 parallel groups would give 1600 effective bits per total track length provided that the drum is rotated 8 times for each 400 feet of primary conveyor travel. In such a case, successive 12 digit groups of write and read heads are activated, in turn, for one revolution of the drum only. In this way, therefore, a drum having a track length of 200 bits and having 100 tracks would suffice, since 96 recording tracks would be needed and one clock track should be provided. On the secondary drums, however, there are only six tracks in each group and, if the secondary conveyors are of the same effective length as the primary conveyors, a drum having 50 tracks of 200 bits each will be satisfactory, provided that it is driven at 8 times normal speed and the write and read heads are activated at the appropriate times. Alternatively, such drums may be used in series, one for only a portion of the conveyor length.

*Decoding gates*

Because the coded primary and secondary diverter information is recorded on memory drum tracks which pass beneath all primary and secondary diverter read heads (respectively), a decoding gate must be interposed between each set of read heads and the corresponding diverter so that the diverter is only actuated when the correct code word is presented to the gate. Naturally, no two primary diverter decoding gates (DG–P0S1 to DG–P9S6) are identical and no two secondary diverter decoding gates (DG–S1–1 to DG–S6–52) are identical since, if they were, they could not distinguish between the code words corresponding to the associated diverters.

If, in the present application, the primary and secondary diverters are numbered in separate series, then the code "word" for each gate is simply the binary number corresponding to the decimal number of the diverter. Thus, each of the primary decoding gates will have five inputs and one output, and the five inputs may be marked with the "key" code word as indicated in FIGURES 18A and 18B of the accompanying drawings. The secondary decoding gates for each secondary diverter, apart from having six inputs instead of five, are similar to the primary gates and may be marked with the "key" words.

Each decoding gate is formed from common and well known logic elements, most gates including one or more AND circuits, an OR circuit and an Inhibitor circuit, although those gates which have only one "1" in their code words do not include an AND gate. In general, the "1" terminals of each decoding gate are connected through successive AND circuits so that an output from the last circuit is only obtained when an input pulse is simultaneously received by each of the "1" terminals; all the "0" terminals are connected directly to a single OR circuit so that when an input pulse appears at any one of the "0" terminals the OR circuit will provide a corresponding output pulse; and the output of the last AND circuit is connected, together with the output of the OR circuit, to an inhibitor circuit which will only provide an output if there is an input from the AND circuit and if there is no blocking input from the OR circuit.

Control system—Setup

It will be assumed that the control system has been constructed and that, by various test runs and the like, the diverters and their respective controls are operating precisely and reliably. The first important adjustment is the positioning of photo sensor PEP9 with respect to the keyboard 68-P9 and the coding operator and, consequently, the positioning of the write heads on drum MDP9. If photo sensor PEP9 is placed as closely as possible to the coding operator along the primary conveyor P9, the time during which the warning light is "on" is minimal and will usually be shorter than time required by the coding operator to read the destination of the next parcel and to set the corresponding code on the keyboard 68-P9. Thus, in effect, the warning light is a safety measure which, under normal circumstances, will not delay the encoding of parcels as they pass the coding operator. However, it may be desirable to introduce a certain amount of delay by means of the warning light by spacing the photo sensor PEP9 further along the conveyor P9 and away from the coding operator so as to, in effect, prevent parcels on the conveyor P9 from being spaced too closely to one another.

Although the above adjustments are important, it is essential to "make-up" the patch panels before sorting can begin. The patch panels give the machine flexibility without requiring new codes to be learned by the coding operators. It is therefore only necessary to decide which destinations will be grouped together for manual sorting and which will be mechanically sorted (i.e., on secondary conveyors S1 to S6). For example, where a parcel is to be directed to a destination allocated to any one of the secondary conveyors S*a* to S*q*, the socket on board 216 will be connected by a diode plug lead 214 to the appropriate primary diverter socket 219 on board 218. Of course, many destination sockets 214 will be connected to one primary diverter socket 219, and the same destinations may also be connected to one or more secondary diverter sockets 221. Since there are a great many more sockets on board 216 than on boards 218 and 220 combined, a large number of the plug leads 214 will be connected together so that, as previously indicated, any given sack-out station can be set to handle parcels for a large variety of destinations. The patch panel PP-P9, therefore, provides a convenient means whereby parcel destinations can be sorted either automatically along the secondary conveyors or by hand at the manual sack-out stations, the system being changed according to seasonal or alternations in mail densities without the need for the keyboard operators to memorize different codes.

Control system operation

In order to discuss the operation of the control system it will be assumed that: the system has been set up as indicated, two parcels are placed in succession on conveyor P9, two on conveyor P8, and two further parcels are then placed in succession on conveyor P9; the first two parcels are addressed to destinations which, in the present system, require final manual sorting at sack-out stations on secondary conveyors S*p* and S*q*, respectively, and the last four parcels are addressed to destinations which need only mechanical sorting and are located along secondary conveyor S2 at secondary diverters 39, 40, 41 and 42, respectively.

As the first parcel is presented to the coding operator at panel 68-P9, he extracts the code from the address and sets the knobs or keys on the coding panel accordingly and then presses the completion bar 202 which connects the source of positive potential to the appropriate patch panel input socket 214, and, through the prearranged diode lead, to the appropriate primary diverter socket 219. Immediately, the binary encoder creates the code word (10000) corresponding to the primary diverter (PDS*p*) to be operated and writes this word into the primary half of the primary storage PS-P9. The depression of the completion bar 204 has also switched "on" the indicator light 206 and the operator therefore proceeds with the coding of the next parcel but does not press the completion bar 204 again until the light is turned "off."

As the first parcel proceeds along conveyor P9, it breaks the light to PEP9 and creates an output pulse "*a*" of a duration proportional to the parcel length and presents this pulse to a trigger circuit 246 which generates a single short negative trigger pulse "*b*" at the termination of the first pulse (*a*). The trigger pulse is, in turn, presented to a monostable multivibrator 248 which immediately generates an output positive pulse "*c*" having a length of about twice a clock pulse. The latter pulse (*c*) passes along the call-out line 212 to AND shift circuit 237 to call-out or shift the code word from the primary storage PS-P9 to the memory drum MD-P9 in time with the clock pulses "*d*"; also, as previously indicated, this pulse effects the turning off of the warning light 206 on the keyboard 68-P9. In this manner the first four parcels are coded and dispatched along conveyor P9 and the last two parcels are coded at keyboard 68-P8 and dispatched along conveyor P8, the respective code words being recorded in succession on memory drums MD-P9 and MD-P8 (not shown).

Each code word therefore travels past successive groups of read heads on drum MD-P9 in synchronism with travel of the corresponding parcel on primary conveyor P9 past successive primary diverters until the first word (10000) is positioned directly beneath the group of read heads RH-P9S*p*. The coded word is then presented to the input terminals of the primary decoding gate DG-P9S*p*. Since no pulses are presented to the OR circuit of this gate and, since the pulse is presented to the inhibit circuit, the latter pulse is passed as pulse "*e*" and operates the connected power amplifier PA-P9S*p*, relay RE-P9S*p*, and the associated diverter PD-P9S*p*. To ensure that the primary diverter solenoid valve is energized for the entire forward stroke of the diverter blade, relay contacts RE-1 (P9S*p*) operate the diverter operating relay RD previously described. Relay RD remains closed for the full forward stroke of the primary diverter PD-P9S*p*. Thus, the first parcel has been diverted onto the correct secondary conveyor and will proceed therealong and be manually sorted into its appropriate output station.

In order to decrease the likelihood of subsequent error in the recognition of the coded words, the output pulse "*e*" from the primary decoding gate is extending by means of a monostable multivibrator MM-P9S*p* to about three times the clock pulse duration and passed with clock pulses "*d*" as an input to an AND circuit 254 from which two or three appropriately timed erase pulses will be passed to the erase heads of the primary memory drum, thereby effecting the erasure of the coded word (10000) which effected the operation of the primary diverter PD-P9S*p*.

In a similar manner the next code word (10001) is presented to the read heads RH-P9S*p* on the primary drum MD-P9 just as the second parcel is located opposite the primary diverter PD-P9S*p*. Again, the first "1" digit of the word is presented to the inhibit circuit of DG-P9S*p* but, in contrast to the previous word, a "1" digit is also presented to the OR circuit, and blocks the inhibitor circuit so that no output pulse passes from the decoding gate DG-P9S*p* and the primary diverter PD-P9S*p* is not operated and the code word is not erased from the primary memory drum MD-P9. However, when the code word is presented to the read heads RH-P9S*q* on the memory drum MD-P9 the primary decoding gate DG-P9S*q* connected therewith recognizes the code word (10001) and effects the operation of the diverter PD–P9Sq and the erasure of the information from the memory drum MD–P9.

The information recorded on the primary memory drum MD–P9 for the fifth and sixth parcels will include the same primary word (10011) corresponding to primary diverter PD–P9S2 to be operated and two secondary words (101001 and 101010) corresponding to the secondary diverters, SD–S241 and SD–S242, respectively, to be operated for each parcel, the words being recorded on the appropriate portions of the drum. The primary words will not be recognized by any of the primary decoding gates DG–P9Sa to S1 but, when the third primary word (10010) recorded on the primary memory drum (which is now the first word remaining on the drum) reaches the set of read heads RH–P9S2, primary diverter PD–P9S2 is operated and the erase pulses are again generated. The operation of primary diverter PD–P9S2 is, of course, conditional upon the closure of switch contacts T–1 (P9S2) which are only opened when buffer BC–P9S2 is full.

It is important to note that the secondary diverter information on drum MD–P9 cannot be transferred to a full buffer register or to any buffer register other than the correct one. For example, when the information on drum MD–P9 corresponding to the fifth parcel was presented to read heads RH–P9S1, the five primary heads were able to generate the appropriate primary code since each was grounded. However, the six secondary heads were not necessarily able to generate an output as the common ground line 256 is only grounded if contacts W–1 (P9S1) are closed and if gate circuit G–P9S1 is "closed." Contacts W–1 (P9S1) are closed unless buffer BC–P9S1 is full, while gate G–P9S1 is only "closed" for the duration of the gating pulse taken from the output of monostable multivibrators MM–P9S1. Thus, unless decoding gate DG–P9S1 recognizes the primary code word, the secondary code word is not passed to the buffer register BR–P9S1 and neither word is erased. The staggering of the primary and secondary read heads of groups RH–P9S1 to S6 and the length of the gating pulse ensures that the secondary word is correctly recorded and erased.

Therefore, just as primary diverter PD–P9S2 operates to deflect the fifth parcel from P9 into BC–P9S2 the secondary word (101001) is transferred to the first stage of buffer register BR–P9S2 and erased from drum MD–P9. (This occurs in the same manner as indicated for the transference of information into BR–P9S1.) If buffer BC–P9S2 is empty, the parcel will pass to compartment A and corresponding shift signals will be generated to move the coded information from the first into the second and then the third stage of the buffer register BR–P9S2.

Assuming that the third and fourth parcels have been correctly coded on the keyboard 68–P8, have traveled down conveyor P8 and been deflected into buffer BC–P8S2 and are passing buffer BC–P9S2 on conveyor S2, gate A of BC–P9S2 will remain closed until these parcels are clear. The sixth parcel will, therefore, be deflected into compartment B of buffer BC–P9S1 and its code word (101010) will be stored in the second stage of register BR–P9S2. Once the third and fourth parcels are clear of buffer BC–P9S2, the buffer BC–P9S2 will release the fifth and sixth parcels so that all four parcels proceed down conveyor S2 toward the secondary diverters.

When the fifth and sixth parcels were released from buffer BC–P9S2 the associated secondary diverter code words were transferred from the buffer register BR–P9S2 into the secondary storage SS–P9S2 by shift signals derived from photo sensor PHAL (P9S2). As each parcel passed photo sensor PES, a signal was generated by the delay and sensing gates DT–P9S2 and ST–P9S2 and passed to AND circuit 258 which made sure that the words were written on the drum MD–S2 in synchronism with the clock pulses "f." It should be noted that the output of secondary storage SS–P8S2 is connected to a different set of write heads (WH–BP8S2) on drum MD–S2 from the write heads (WH–BP9S2) to which the output of secondary storage SS–P9S2 is connected. Therefore, the code words (100111, 101000, 101001, and 101010) proceed in order past the various sets of read heads on drum MD–S2, just as the third, fourth, fifth and sixth parcels travel down conveyor S2 past the various secondary diverters.

As the third parcel comes beneath diverter SD–S2–39/40 its code is presented simultaneously to decoder gates DG–S2–39 and DG–S2–40, but is recognized only by DG–S2–39 which effects the operation of diverter SD–S2–39/40 in the correct direction. In a similar manner to the primary memory drum, the information is erased from the drum MD–S2 by pulses derived from a monostable-multivibrator MM–S2–39, and passed through the OR circuit 260 and the AND circuit 262. When the next parcel approaches SD–S2–39/40, its code word (101000) is also read out by heads RH–S2–39/40 but it is not recognized by decoding gate DG–S2–39 and is recognized by gate DG–S2–40. The diverter SD–S2–39/40 is then operated by power amplifier PA–S2–39 to divert the fourth parcel in the other direction. Again, the information is erased from the drum MD–S2 by pulses derived from monostable multivibrator MM–S2–39 and OR circuit 260 and passed to the erase heads EH–S2–39/40. The fifth and sixth parcels pass the diverter SD–S2–39/40 without deflection and the corresponding code is not erased until the appropriate diverter operates. When the fifth parcel arrives below diverter SD–S2–41/42, gate DG–S2–41 operates the diverter appropriately and causes the code to be erased. Similarly, the code of the sixth parcel is recognized by gate DG–S2–42 and the diverter SD–S2–41/42 is operated and the code word (101010) on drum MD–S2 is erased.

It will be appreciated that the control system can operate at speeds considerably greater than the speed with which the conveyors and diverters can operate so that mechanical considerations will form the limit to the capacity of the machine. Also, it will be recalled that, due to the manner in which the writing and erase pulses are generated, it is possible for the same word to be recorded on a maximum of two consecutive spaces and it is possible for the erase pulses to extend over a maximum of four consecutive spaces. This does not affect the control operation as there will always be more than ten spaces or bits between two consecutive words.

Furthermore, if a parcel is accidentally removed from a primary conveyor before diversion into the pre-designated buffer, the next parcel to be actually diverted into that buffer may be subsequently mis-directed as its code would be superimposed on the code of the removed parcel which is already in the buffer register first stage. The accident would affect only the next parcel entering that diverter and would not mis-direct all subsequent parcels passing through that buffer. Such an error could be averted if a photo sensor were to be located at the mouth of the buffer and connected so that, if no parcel is in fact diverted, information transfer to the first section of the corresponding buffer register will be blocked, or, information in the first section will be erased.

The parcel sorting system above-described can be seen to incorporate all the objects of the invention outlined above and to provide means whereby large quantities of parcels or similar articles can be rapidly sorted into very many classes. However, various alterations and additions can be made to the above-described system, and certain units thereof may be replaced as indicated, without departing from the spirit or scope of the invention.

Having thus described our invention, what we claim as new and desire to protect by Letters Patent is:

1. An article sorting system comprising a plurality of primary conveyors, a plurality of secondary conveyors, a plurality of primary article diverters disposed along said primary conveyors, a plurality of multistage sequentially operable buffer conveyors for receiving articles diverted by an associated primary diverter and transferring them to the associated secondary conveyor, a plurality of article destination stations disposed along each secondary conveyor, and a secondary article diverter at each destination station; code register means at each primary conveyor for recording an assignment of one primary diverter and of one secondary diverter along the associated secondary conveyor, primary conveyor memory means, means for transferring both the primary and the secondary article diverter assignments from said code register means to said primary conveyor memory means, means for operating the assigned diverter by said primary conveyor memory means when an article reaches its assigned primary diverter, a multistage register for the buffer conveyor, means for transferring the secondary diverter assignment from said primary memory means to the first stage of said register upon operation of said primary diverter, means for shifting the secondary diverter assignment from stage to stage of said register in response to stepwise passage of articles through said buffer conveyor, secondary conveyor memory means, means for releasing articles from each buffer conveyor when the distance between the next approaching parcel on said secondary conveyor and the buffer conveyor at least equals a predetermined minimum distance, means for transferring the secondary diverter assignment from the last stage of said buffer conveyor register to said secondary conveyor memory means after release of an article from the associated buffer conveyor, and means for operating the assigned secondary diverter by said secondary conveyor memory means when an article reaches its assigned secondary diverter.

2. An article sorting system comprising a plurality of primary conveyors having input stations, a plurality of secondary conveyors, a plurality of primary article diverters disposed along the primary conveyors, diverting articles from the associated primary conveyor, a multistage sequentially operable buffer conveyor at each conveyor intersection for receiving articles diverted from the associated primary conveyor and transferring them to the associated secondary conveyor, a plurality of article destination stations disposed along each secondary conveyor, a secondary article diverter at each destination station, code register means at each primary conveyor input station for recording an assignment of a primary diverter and an assignment of a secondary diverter along the associated secondary conveyor, primary conveyor analog memory means, primary article sensing means adjacent the input station of each primary conveyor, means responsive to said primary article sensing means for transferring both primary and secondary article diverter assignments from said code register means to said primary conveyor memory means, means for operating the assigned primary diverter in analog response to its assignment on said primary conveyor memory means, a multistage buffer conveyor register, means for transferring the secondary diverter assignment from said primary memory means to the first stage of said buffer conveyor register upon operation of said primary diverter, means for shifting the secondary diverter assignment from stage to stage of said buffer conveyor register in response to stepwise passage of articles through said buffer conveyor, a secondary conveyor analog memory, means for releasing articles from each buffer conveyor when the distance between the next approaching parcel on said secondary conveyor and the buffer conveyor at least a predetermined minimum distance, secondary article sensing means at said secondary conveyors downstream of said buffer conveyors, means responsive to said secondary article sensing means for transferring the secondary diverter assignment from the last stage of said buffer conveyor register to said secondary conveyor memory after release of an article from the associated buffer conveyor, and means for operating the assigned secondary diverter in analog response to its assignment on said secondary conveyor memory.

3. An article sorting system comprising a plurality of generally parallel primary conveyors having input stations, a plurality of generally parallel secondary conveyors intersecting said primary conveyors, a primary article diverter adjacent each conveyor intersection for diverting articles from the associated primary conveyor, a multistage sequentially operable buffer conveyor at each conveyor intersection for receiving articles diverted from the associated primary conveyor and transferring them to the associated secondary conveyor, a plurality of article destination stations disposed along each secondary conveyor, a secondary article diverter at each destination station, code register means for each primary conveyor for recording an assignment of a primary diverter and an assignment of a secondary diverter along the associated secondary conveyor primary conveyor analog memory means, primary article sensing means adjacent the input station of each primary conveyor, means responsive to said primary article sensing means for transferring both primary and secondary article diverter assignments from said code register means to said primary conveyor memory means, means for operating the assigned primary diverter in analog response to its assignment on said primary conveyor memory means, a multistage buffer conveyor register, means for transferring the secondary diverter assignment from said primary memory means to the first stage of said buffer conveyor register upon operation of said primary diverter, means for shifting the secondary diverter assignment from stage to stage of said buffer conveyor register in response to stepwise passage of articles through said buffer conveyor, a secondary conveyor analog member, means for releasing articles from each buffer conveyor when the distance between the next approaching parcel on said secondary conveyor and the buffer conveyor at least equals a predetermined minimum distance, secondary article sensing means at said secondary conveyors downstream said buffer conveyors, means responsive to said secondary article sensing means for transferring the secondary diverter assignment from the last stage of said buffer conveyor register to said secondary conveyor memory after release of an article from the associated buffer conveyor, and means for operating the assigned secondary diverter in analog response to its assignment on said secondary conveyor memory.

4. An article sorting system comprising a plurality of primary conveyors having input stations, an operator paced feed conveyor at each input station, a plurality of secondary conveyors intersecting said primary conveyors, a primary article diverter adjacent each conveyor intersection for diverting articles from the associated primary conveyor, a multistage sequentially operable buffer conveyor at each conveyor intersection for receiving articles diverted from the associated primary conveyor and transferring them to the associated secondary conveyor, a plurality of article destination stations disposed along each secondary conveyor, a secondary article diverter at each destination station, code register means for each primary conveyor for recording an assignment of a primary diverter and an assignment of a secondary diverter along the associated secondary conveyor, primary conveyor analog memory means, primary article sensing means adjacent the input station of each primary conveyor, means responsive to said primary article sensing means for transferring both primary and secondary article diverter assignments from said code register means to said primary conveyor memory means, means for operating the assigned primary diverter in analog response to its assignment on said primary conveyor memory means, a multistage buffer conveyor register, means for transferring the secondary diverter assignment from said primary memory means to the first stage of said buffer conveyor register upon operation of said primary diverter, means for shifting the secondary diverter assignment from stage to stage of said buffer conveyor register in response to stepwise passage of articles through said buffer conveyor, a secondary conveyor analog memory, means for releasing articles from each buffer conveyor when the distance between the next approaching parcel on said secondary conveyor and the buffer conveyor at least equals a predetermined minimum distance, secondary article sensing means at said secondary conveyors downstream said buffer conveyors, means reponsive to said secondary article sensing means for transferring the secondary diverter assignment from the last stage of said buffer conveyor register to said secondary conveyor memory after release of an article from the associated buffer conveyor, and means for operating the assigned secondary diverter in analog response to its assigment on said secondary conveyor memory.

5. An article sorting system comprising a plurality of primary conveyors having input stations, a plurality of secondary conveyors, intersecting said primary conveyors, a primary article diverter adjacent each conveyor intersection for diverting articles from the associated primary conveyor, a multistage sequentially operable buffer conveyor at each conveyor intersection for receiving articles diverted from the associated primary conveyor and transferring them to the associated secondary conveyor, said buffer conveyors having a plurality of article retaining gate means, a plurality of article destination stations disposed along each secondary conveyor, a secondary article diverter at each destination station, code register means for each primary conveyor for recording an assignment of a primary diverter and an assignment of a secondary diverter along the associated secondary conveyor, primary conveyor analog memory means, primary article sensing means adjacent the input station of each primary conveyor, means responsive to said primary article sensing means for transferring both primary and secondary article diverter assignments from said code register means to said primary conveyor memory means, means for operating the assigned primary diverter in analog response to its assignment on said primary conveyor memory means, a multistage buffer conveyor register, means for transferring the secondary diverter assignment from said primary memory means to the first stage of said buffer conveyor register upon operation of said primary diverter, means for shifting the secondary diverter assignment from stage to stage of said buffer conveyor register in reponse to stepwise passage of articles through the gate means of said buffer conveyor, a secondary conveyor analog memory, means for releasing articles from each buffer conveyor when the distance between the next approaching parcel on said secondary conveyor and the buffer conveyor at least equals a predetermined minimum distance, secondary article sensing means at said secondary conveyors downstream said buffer conveyors, means responsive to said secondary article sensing means for transferring the secondary diverter assignment from the last stage of said buffer conveyor register to said secondary conveyor memory after release of an article from the associated buffer conveyor, and means for operating the assigned secondary diverter in analog response to its assignment on said secondary conveyor memory.

6. An article sorting system comprising a plurality of primary conveyors, an intersecting secondary conveyor, buffer storage conveyors for transferring articles from each primary conveyor to the secondary conveyor, each of said buffer storage conveyors comprising a series of successive, single article storage conveyor sections, article sensor means at the delivery end of each of said buffer storage conveyor sections, means controlled by said article sensor means for sequentially advancing a single article from section to section, article sensor means at said secondary conveyor upstream of each buffer storage conveyor for providing a release signal, and means responsive to said release signal for discharging a single article in the last section of the series, and no other article, onto said secondary conveyor.

7. An article sorting system comprising a plurality of primary conveyors, intersecting secondary sorting conveyors, primary article diverters at each intersection for selectively diverting articles from a primary conveyor for ultimate transfer to the intersecting secondary sorting conveyor, a plurality of secondary article diverters disposed along said secondary sorting conveyors for selectively diverting articles from said secondary conveyors to their destination zones, and buffer storage conveyors at each intersection for receiving articles directly from said primary diverters and transferring the articles directly to the secondary sorting conveyor at the intersection, said buffer storage conveyors comprising individual article conveyor sections for sequentially and individually transferring articles from the primary conveyor to the associated secondary conveyor, and means for operating said sections in a series of controlled individual steps, the number of said steps being identical under all conditions of operation of said buffer storage means to facilitate keeping track of the articles as they pass through the buffer conveyors.

8. An article sorting system comprising a plurality of primary conveyors, a plurality of intersecting secondary sorting conveyors, primary diverters at each conveyor intersection, step by step buffer storage conveyors at each intersection for receiving articles diverted by said primary diverters and for storing at least two diverted articles, said buffer storage conveyors having means for transferring each article step by step to the associated secondary sorting conveyor, and a plurality of secondary diverters disposed along each intersecting secondary sorting conveyor; a system control comprising primary storage code register means at each primary conveyor for recording for each article both an assignment of one of said primary diverters and an assignment of one of said secondary diverters disposed along the secondary sorting conveyor that is to receive the article diverted by said assigned primary diverter, primary memory means for keeping track of each article as it passes along the primary conveyor and for storing secondary diverter assignments, means for transferring the article assignments of both the primary and the secondary diverters from said code register means to said primary memory means when an article reaches a predetermined position on its primary conveyor, means for operating said primary diverters under control of said primary memory means for transferring the article to the buffer storage conveyor at the secondary sorting conveyor which has the assigned secondary diverter, buffer conveyor shift registers for receiving secondary diverter assignments from said primary memory means, means for operating said shift registers by step by step passage of the article through said buffer storage conveyor, secondary memory means for keeping track of the article as it passes along the assigned secondary sorting conveyor, means for transferring the secondary diverter assignment from said shift register to said secondary sorting conveyor memory means when the article is transferred from the buffer conveyor to the assigned secondary sorting conveyor, and means for operating the assigned secondary diverter at the assigned secondary sorting conveyor under control of said secondary memory means, and in response to the original secondary diverter assignment, when the article reaches the assigned secondary diverter.

9. The sorting system of claim 8, wherein said system control includes means for sensing articles on the secondary conveyors upstream of the buffer conveyors, and means controlled by said article sensing means inhibiting the transfer of articles from the buffer storage conveyors to their associated secondary sorting conveyors until a predetermined minimum spacing between articles on the secondary conveyors will be established upon such release.

References Cited by the Examiner

UNITED STATES PATENTS

| | | | |
|---|---|---|---|
| 2,194,381 | 3/1940 | Cadman | 214—11 |
| 2,670,087 | 2/1954 | Stehlik | 214—11 |
| 2,728,466 | 12/1955 | Postlewaite | 214—11 |
| 2,843,278 | 7/1958 | Oveflander | 214—152 |
| 2,959,308 | 11/1960 | Werner | 214—152 |
| 2,988,195 | 6/1961 | McHugh. | |
| 3,013,648 | 12/1961 | Kouach | 198—35 |
| 3,033,366 | 5/1962 | Atanasoff | 214—11 X |
| 3,039,593 | 6/1962 | Edmonds | 198—35 |
| 3,044,638 | 7/1962 | Bruce | 214—11 |
| 3,049,247 | 8/1962 | Lemelson | 214—11 |
| 3,071,262 | 1/1963 | Bosch | 214—11 X |
| 3,096,871 | 7/1963 | Anderson | 214—11 X |
| 3,100,040 | 8/1963 | Kleist | 214—11 X |
| 3,103,285 | 9/1963 | Goodell | 214—11 |
| 3,105,601 | 10/1963 | Smoll | 214—11 |
| 3,118,549 | 1/1964 | Hoellen | 214—11 X |

FOREIGN PATENTS 632,403  11/1949  Great Britain.

GERALD M. FORLENZA, *Primary Examiner.*

MORRIS TEMIN, HUGO O. SCHULZ, *Examiners.*

UNITED STATES PATENT OFFICE
CERTIFICATE OF CORRECTION

Patent No. 3,252,595                         May 24, 1966

William W. Collins et al.

It is certified that error appears in the above identified patent and that said Letters Patent are hereby corrected as shown below:

Column 4, line 66, after "baffles" insert -- 75 --. Column 10, line 52, "(22)" should read -- (11) --. Column 16, line 69, "timer" should read -- time --. Column 31, line 70, after "least" insert -- equals --.

Signed and sealed this 16th day of September 1969.

(SEAL)
Attest:

Edward M. Fletcher, Jr.                   WILLIAM E. SCHUYLER, JR.
Attesting Officer                           Commissioner of Patents